United States Patent
Smith et al.

(10) Patent No.: US 8,331,547 B2
(45) Date of Patent: Dec. 11, 2012

(54) CALL HANDLING

(75) Inventors: Steven Smith, Richmond (GB); John Price, London (GB)

(73) Assignee: Arona, Ltd. (GB)

( * ) Notice: Subject to any disclaimer, the term of this patent is extended or adjusted under 35 U.S.C. 154(b) by 959 days.

(21) Appl. No.: 11/919,802

(22) PCT Filed: May 4, 2006

(86) PCT No.: PCT/GB2006/001623
§ 371 (c)(1),
(2), (4) Date: Jan. 7, 2008

(87) PCT Pub. No.: WO2006/117561
PCT Pub. Date: Nov. 9, 2006

(65) Prior Publication Data
US 2010/0166166 A1    Jul. 1, 2010

(30) Foreign Application Priority Data
May 4, 2005 (GB) .................................. 0509080.8

(51) Int. Cl.
*H04M 3/42* (2006.01)
(52) U.S. Cl. ......... 379/211.01; 379/211.02; 379/212.01; 379/210.01; 379/210.02; 379/207.13
(58) Field of Classification Search ............ 379/211.01, 379/211.02, 212.01, 210.01, 210.02, 207.13–207.16, 379/433.07, 207.12; 455/415, 417, 445, 455/235.1, 414.2
See application file for complete search history.

(56) References Cited

U.S. PATENT DOCUMENTS

| | | | |
|---|---|---|---|
| 5,329,578 A * | 7/1994 | Brennan et al. | 379/211.03 |
| 6,728,360 B1 * | 4/2004 | Brennan | 379/211.04 |
| 6,748,068 B1 | 6/2004 | Walsh et al. | |
| 6,961,590 B1 * | 11/2005 | Toebes | 455/564 |
| 7,359,499 B1 * | 4/2008 | Frentz et al. | 379/210.02 |
| 7,415,104 B2 * | 8/2008 | Gray et al. | 379/201.01 |
| 2002/0076026 A1 * | 6/2002 | Batten | 379/210.02 |
| 2003/0002636 A1 * | 1/2003 | Nelson | 379/90.01 |
| 2003/0134626 A1 * | 7/2003 | Himmel et al. | 455/419 |
| 2003/0152199 A1 | 8/2003 | Kuhn et al. | |

(Continued)

FOREIGN PATENT DOCUMENTS

EP    0 986 875 A    3/2000

(Continued)

OTHER PUBLICATIONS

International Search Report and Written Opinion of the International Searching Authority for PCT/GB2006/001623, dated Aug. 3, 2006.

(Continued)

*Primary Examiner* — Joseph J Nguyen
(74) *Attorney, Agent, or Firm* — Harness, Dickey & Pierce, P.L.C.

(57) ABSTRACT

The present invention relates to an apparatus (10) for handling telephone calls which comprises: means for configuring the operation of the apparatus based on user preferences relating to the handling of calls from particular callers, means for storing the user preferences, means for processing incoming calls based on the user preferences, and means for receiving updates to the user preferences in dependence on changes to a preference database for storing the preferences of at least one user. The invention also relates to a telecommunications system, and to an associated server.

21 Claims, 13 Drawing Sheets

U.S. PATENT DOCUMENTS

| | | | |
|---|---|---|---|
| 2003/0215078 A1* | 11/2003 | Brahm et al. | 379/211.02 |
| 2004/0114747 A1* | 6/2004 | Trandal et al. | 379/211.02 |
| 2004/0116103 A1 | 6/2004 | Kurihara | |
| 2004/0132438 A1 | 7/2004 | White | |
| 2005/0053218 A1* | 3/2005 | Kim | 379/211.02 |
| 2005/0141687 A1* | 6/2005 | Ozugur et al. | 379/201.02 |
| 2006/0031314 A1* | 2/2006 | Brahms et al. | 709/206 |

FOREIGN PATENT DOCUMENTS

| | | |
|---|---|---|
| EP | 1398942 A2 | 3/2004 |
| WO | WO-98/23080 A | 5/1998 |
| WO | WO-00/60840 A2 | 10/2000 |
| WO | WO-02/32095 A1 | 4/2002 |
| WO | WO-03/069877 A2 | 8/2003 |
| WO | WO-03/096709 A2 | 11/2003 |

OTHER PUBLICATIONS

Search Report for GB0509080.8, dated Jun. 14, 2007.
Search Report for GB0509080.8, dated Oct. 5, 2005.

* cited by examiner

CALL HANDLING

This invention relates to an apparatus for handling telephone calls. This invention also relates to a telecommunications system and to a server.

According to one aspect of the invention, there is provided apparatus for handling telephone calls which comprises: means (in the form of a memory) for storing user preferences relating to the handling of calls from particular callers, means (in the form of a processor) for processing incoming calls based on the user preferences, and means (in the form of a receiver) for receiving updates to the user preferences in dependence on changes to a preference database for storing the preferences of at least one user.

Preferably, the apparatus further comprises means (in the form of a processor and associated memory) for configuring the operation of the apparatus based on user preferences relating to the handling of calls from particular callers.

Power of Attorney, Trust Groups and Call Handling Aspects

According to a another aspect of the invention, there is provided an apparatus for handling telephone calls which comprises: means (in the form of a processor and associated memory) for configuring the operation of the apparatus based on user preferences relating to the handling of calls from particular callers, means (in the form of a memory) for storing the user preferences, means (in the form of a processor) for processing incoming calls based on the user preferences, and means (in the form of a receiver) for receiving updates to the user preferences in dependence on changes to a preference database for storing the preferences of at least one user.

In this way a user may be provided with a more efficient facility for handling the wide variety of incoming calls to a domestic or other environment.

Preferably, the configuration means enables the user to specify at least one category of caller which should be handled in a particular manner.

Thus, for example, the user to specify that calls from family members are to be handled in a particular fashion.

Preferably, the configuration means enables the user to augment the callers in each category with callers specified in similar categories provided in the preference database.

In this way a user may incorporate callers in, say, another user's "family" category into the user's family category. Such calls are then handled in accordance with the user's preferences for the handling of such calls.

Preferably, the configuration means enables the user to add the callers to the user's categories.

Preferably, the receiving means is adapted to update the user's categories in dependence on changes to the callers in similar categories provided in the preference database.

Preferably, the configuration means enables the user to specify that particular categories of callers provided in the central preference database should be handled in a particular manner.

Preferably, the configuration means enables a user to specify that callers in the or each category should be conditionally accepted or rejected.

Preferably, the configuration means enables the user to add the particular categories of callers to the user preferences.

Preferably, the receiving means is adapted to update the user preferences in dependence on changes to the particular categories of callers.

Typically, the categories include: utility companies, telemarketers, charities, home users, business callers, market researchers, known nuisance callers, and callers from particular geographic origins.

Thus, for example, in a case where a user has identified "utility companies" as a category, and incorporated various utility companies into that category, changes to the category in the preference database will be updated on the apparatus.

Preferably, the configuration means enables the user to specify that the user is willing to adopt at least some of a further user's processing preferences relating to particular categories of callers, the further user's preferences being provided in the preference database.

Thus, for example, a user may decide to adapt the processing preferences that another user adopts for the handling of calls from charities.

Preferably, the configuration means enables a user to specify that the user is willing to adopt all of a further user's preferences relating to the handling of calls from particular callers, the further user's preferences being provided in the preference database.

Preferably, the configuration means enables a user to augment the user preferences with the further user's preferences.

Preferably, the receiving means is adapted to update the user preferences in dependence on changes to the further user's preferences.

Preferably, the configuration means enables a user to specify that the user is willing to accept all calls that at least a further user listed in the preference database is willing to accept.

Preferably, the configuration means enables a user to specify that the user is unwilling to accept all calls that at least a further user listed in the preference database is unwilling to accept.

Preferably, the configuration means enables a user to augment the user preferences with the further user's preferences.

Preferably, the receiving means is adapted to update the user preferences in dependence on changes to the further user's preferences.

Preferably, the configuration means enables a user to subscribe to at least one group of users listed on the preference database and having particular preferences relating to the handling of calls from particular callers.

Preferably, the configuration means enables the user to add the group's preferences to the user preferences.

Preferably, the receiving means is adapted to update the user preferences in dependence on changes to the group's preferences.

Preferably, the receiving means further comprises a communications interface for establishing a communication link between the apparatus and the preference database.

Preferably, the communications interface is adapted to establish a communication link between the apparatus and the preference database on a periodic basis.

Preferably, the communications interface is programmable by the user, thereby to enable the user to specify the periodicity of the establishment of the communication link with the central preference database.

Preferably, the receiving means is adapted to update the user preferences when there is a communication link between the apparatus and the preference database.

Preferably, the configuration means further enables the user to configure processing preferences relating to the handling of incoming calls.

Preferably, the processing preferences are based on at least one of the following criteria: the date, the day of the week, the time of day, the geographical origin of the call, any distinctive ring data associated with the call, the status of the apparatus, and whether the call is a voice call or a data call.

Preferably, the configuration means enables the user to specify processing preferences relating to particular categories of callers.

Preferably, the configuration means enables the user to specify that the user is willing to adopt at least some of a further user's processing preferences, the further user's processing preferences being provided in the preference database.

Preferably, the configuration means enables the user to specify that the user is willing to adopt at least some of a further user's processing preferences relating to particular categories of callers, the further user's preferences being provided in the preference database.

Preferably, the configuration means enables the user to specify the use of default processing preferences.

Preferably, the particular default processing preferences are provided for particular categories of callers.

Preferably, the configuration means further enables the user to configure routing preferences for incoming calls.

Preferably, the processing means is adapted to route incoming calls to at least one of the following devices: a particular telephone extension, a voice-mail box, a facsimile machine, an interactive voice response system, an external telephone, a mobile telephone, and a modem.

Preferably, the configuration means enables the user to specify routing preferences relating to particular categories of callers.

Preferably, the configuration means enables the user to specify that the user is willing to adopt at least some of a further user's routing preferences, the further user's routing preferences being provided in the preference database.

Preferably, the configuration means enables the user to specify that the user is willing to adopt at least some of a further user's routing preferences relating to particular categories of callers, the further user's routing preferences being provided in the preference database.

Preferably, the configuration means enables the user to specify the use of default routing preferences.

Preferably, particular default routing preferences are provided for particular categories of callers.

Preferably, the configuration means further enables the user to configure the processing means to unconditionally accept or reject calls from particular callers.

Preferably, the configuration means further enables the user to configure the processing means to conditionally accept or reject calls from particular callers.

Preferably, the processing means is adapted to identify callers based on information accompanying incoming calls.

Preferably, the information comprises caller line identity (CLI) information.

Preferably, the processing means is adapted to identify callers based on wildcard matching against a portion of the CLI.

Preferably, the information comprises text accompanying caller line identity (CLI) information.

Preferably, the processing means is adapted to identify callers based on wildcard matching against a portion of the text.

Preferably, the apparatus further comprises means for answering incoming calls.

Preferably, the answering means comprises an interactive voice response (IVR) system.

Preferably, the IVR system is adapted to solicit and store information from the caller.

Preferably, the answering means is adapted to route incoming calls based on information provided by a caller.

Preferably, the answering means is adapted to terminate incoming calls in dependence upon information provided by a caller.

Preferably, the information is provided in the form of telephone keys pressed by the caller.

Preferably, the information is provided in the form a voice prompt by the caller.

Preferably, the answering means is adapted to play a pre-recorded announcement message to callers.

Preferably, the pre-recorded announcement message is only played to unknown callers.

Preferably, the announcement message is directed to telemarketing calls.

Preferably, the apparatus further comprises a speech recognition module.

Preferably, the announcement message begins with a distinctive tune.

Distinctive Tune

This important aspect is provided independently. According to another aspect of the invention, there is provided apparatus for handling telephone calls which comprises: (optionally) means (in the form of a processor and associated memory) for configuring the operation of the apparatus based on user preferences relating to the handling of calls from particular callers, means (in the form of a memory) for storing the user preferences, means (in the form of a processor) for processing incoming calls based on the user preferences, and means (in the form of a receiver) for answering incoming calls, the answering means being adapted to play a pre-recorded announcement message to callers which begins with a distinctive sequence of tones.

Preferably, the tone is in the form of a four-note or four-tone tune.

Preferably, the apparatus further comprises means (in the form of a speaker and associated memory) for announcing information relating to a caller to the user.

Preferably, the apparatus may include a text to speech conversion module. More preferably, the text to speech conversion module may be adapted to convert CLI information and or text to speech, which may then be announced to the user.

Preferably, the announcing means comprises an IVR system thereby to enable a user to handle the call based on information relating to the caller.

Preferably, the IVR system enables a user to route the call to a particular destination, and preferably to one of the following destinations: a particular telephone extension, a voice-mail box, a facsimile machine, an interactive voice response system, an external telephone, and a mobile telephone.

Preferably, the configuration means is connectable to the apparatus via a communications link.

Remote Configuration/User Interface Aspects

This important aspect is also provided independently. In accordance with another aspect of the invention, there is provided an apparatus for handling telephone calls which comprises: means for configuring the operation of the apparatus based on user preferences relating to the handling of calls from particular callers, means for storing the user preferences, means for processing incoming calls based on the user preferences, and wherein the configuration means is connectable to the apparatus via a communications link.

Preferably, the configuration means is adapted to establish a communication link with the apparatus following a configuration change by the user.

Preferably, the configuration means is adapted to update the configuration of the apparatus whenever a connection between the apparatus and the configuration means is established.

Preferably, the configuration means comprises a software program running on a personal computer.

Preferably, the personal computer is directly connected to the apparatus.

Preferably, the configuration means is connectable to the apparatus via a server.

Preferably, the configuration means comprises a software program running on the server and accessible via a network connection.

Preferably, the configuration means is accessible via the Internet.

Preferably, the configuration means at least in part comprises a software module running on the apparatus.

Preferably, the configuration means comprises a user interface.

Preferably, the user interface includes an Internet World-Wide-Web page.

Preferably, the configuration means comprises a telephonic interface.

Preferably, the telephonic interface includes an interactive voice response (IVR) system.

Preferably, the telephonic interface includes a human operator.

Preferably, the apparatus further comprises means for displaying current user preferences.

Voicemail Aspects

Preferably, the apparatus further comprises a voicemail system.

Preferably, the voicemail system comprises means (in the form of a router) for routing voicemail messages differently according to user preferences.

Preferably, the voicemail system further comprises means for storing voicemail messages.

Preferably, the voicemail system further comprises means for transmitting the voicemail message to a voicemail server for storage.

Preferably, the voicemail system further comprises means for transmitting voicemail messages via email.

Preferably, the voicemail system is adapted to attach voicemail messages to an email.

Preferably, the voicemail system is adapted to transmit voicemail messages to at least one particular email address based on user preferences.

Preferably, the voicemail system further comprises means (in the form of a transmitter) for transmitting an alert to the user when a voicemail message is left on the voicemail system.

Preferably, the alert is in the form of a wireless message. More preferably, the alert is in the form of a short message service (SMS) message or a pager message.

The alert may also be in the form of an Internet Instant Message.

Fax to Email Conversion Aspects

Preferably, the apparatus further comprises means (in the form of a receiver) for receiving facsimile transmissions.

Preferably, the facsimile receiving means comprises means for storing facsimile transmissions.

Preferably, the facsimile receiving means comprises means for transmitting a stored facsimile transmission to a server for subsequent retrieval by the user.

Preferably, the apparatus further comprises means (in the form of a recorder) for recording voice calls.

Preferably, the voice call recording means comprises means for storing the recorded voice calls.

Preferably, the voice call recording means comprises means (in the form of an activation module) for activating recording.

Preferably, the activation means is responsive to a user pressing at least one key on a telephone keypad.

Preferably, the activation means is responsive to a user pressing a function key.

Preferably, the apparatus further comprises means (in the form of a processor and associated memory) for logging the handling of all calls processed by the apparatus in a processed calls report.

Recording of Telephone Calls

This important feature is provided independently. In accordance with a further aspect of the inventions, there is provided an apparatus for handling telephone calls which comprises: (optionally) means (in the form of a processor and associated memory) for configuring the operation of the apparatus based on user preferences relating to the handling of calls from particular callers, means (in the form of a memory) for storing the user preferences, means (in the form of a processor) for processing incoming calls based on the user preferences, and means (in the form of a processor and associated memory) for logging the handling of all calls processed by the apparatus in a processed calls report.

Preferably, the apparatus further comprises means (in the form of a transmitter) for transmitting the report to the user.

Preferably, the report is transmitted to the user via email.

Preferably, the apparatus further comprises means (in the form of a memory) for logging the handling of each incoming call in an incoming call audit report.

Incoming/Outgoing Call Auditing

According to another aspect of the invention, there is provided an apparatus for handling telephone calls which comprises: (optionally) means (in the form of a processor and associated memory) for configuring the operation of the apparatus based on user preferences relating to the handling of calls from particular callers, means (in the form of a memory) for storing the user preferences, means (in the form of a processor) for processing incoming calls based on the user preferences, and means (in the form of a memory) for logging the handling of each incoming call in an incoming call audit report.

Preferably, the apparatus further comprises means (in the form of a processor and associated memory) for flagging nuisance calls in the incoming call audit report.

Preferably, the apparatus further comprises means (in the form of a transmitter) for transmitting the incoming call audit report to a server.

Outgoing Call Handling

Preferably, the apparatus further comprises means (in the form of a memory) for logging outgoing calls in an outgoing calls report and means for transmitting the report to a server.

This important aspect is also provided independently. In accordance with another aspect of the invention, there is provided an apparatus for handling telephone calls which comprises: (optionally) means (in the form of a processor and associated memory) for configuring the operation of the apparatus based on user preferences relating to the handling of calls from particular callers, means (in the form of a memory) for storing the user preferences, means (in the form of a processor) for processing incoming calls based on the user preferences, means (in the form of a memory) for logging outgoing calls in an outgoing calls report and means for transmitting the report to a server.

Preferably, the report may be made available to the user, for review, on the server.

Preferably, the receiving means is adapted to receive telephone numbers of operations deemed to be undesirable.

Preferably, the storage means is adapted to store telephone numbers of such operations.

Preferably, the apparatus further comprises means (in the form of a switch) for inhibiting the user from placing an outgoing call to such operations.

Upgrading Software on Box

Preferably, the apparatus is controlled by software.

Preferably, the apparatus further comprises means (in the form of a receiver) for receiving software updates.

Professional Answer-Phone Messages

Preferably, the configuration means enables the user to request customised voicemail messages and/or IVR prompts.

Preferably, the configuration means enables a user to specify the content of requested voicemail messages and/or IVR prompts.

Preferably, the receiving means is adapted to receive customised voicemail messages and/or IVR prompts.

Preferably, the apparatus further comprises means (in the form of a processor) for encrypting all content transmitted from the apparatus.

Preferably, the encrypting means operates in accordance with a unique identification code specific to the apparatus.

Preferably, the configuration means enables a user to specify that the user is willing to receive calls in dependence on whether the caller has paid some form of compensation.

Paid Telemarketing

According to another aspect of the invention, there is provided an apparatus for handling telephone calls which comprises: (optionally) means (in the form of a processor and associated memory) for configuring the operation of the apparatus based on user preferences relating to the handling of calls from particular callers, means (in the form of a memory) for storing the user preferences, means (in the form of a processor) for processing incoming calls based on the user preferences, and wherein the configuration means enables a user to specify that the user is willing to receive calls in dependence whether the caller has paid some form of compensation.

Preferably, the calls are in the form of telemarketing calls. More preferably, the user receives the compensation. Alternatively, a third party receives the compensation.

Preferably, the compensation is financial in nature. More preferably, the compensation is dependent on the length of such calls.

Preferably, the apparatus further comprises a reader for reading information which alters the operation of the apparatus.

Card Reader

According to another aspect of the invention, there is provided an apparatus for handling telephone calls which comprises, (optionally) means (in the form of a processor and associated memory) for configuring the operation of the apparatus based on user preferences relating the handling of calls from particular callers, means (in the form of a memory) for storing the user preferences, means (in the form of a processor) for processing incoming calls based on the user preferences, and a reader for reading information which alters the operation of the apparatus.

Preferably, the reader is adapted to read information directly from at least one of the following devices: smart cards, radio frequency transponders, and bar codes.

Preferably, the information is in the form of configuration information, and wherein the configuration means is adapted to configure the apparatus in response to the configuration information read from the device.

Preferably, the information is in the form of updates to user preferences, and wherein receiving means is adapted to update the user preferences in response to the user preference information read from the device.

Preferably, the information is in the form of an instruction to perform a transaction, and the processing means is adapted to perform the transaction in response to the instruction read from the device.

Preferably, the reader is adapted to compare a code stored on the device with a unique apparatus identification code prior to accepting information from the device.

Further Physical Aspects

Preferably, the apparatus is at least in part in the form of a stand-alone device connectable between a telephone and telephone line.

Preferably, the telephone is in the form of a POTS (plain old telephone service) telephone.

Preferably, the telephone is in the form of a fixed wireless telephone.

Preferably, the telephone line is in the form of a POTS line.

Preferably, the telephone line is in the form of any one of the following telephones lines: ISDN (integrated services digital network) line, ADSL (asynchronous digital subscriber line), and cable.

Preferably, the apparatus further comprises means (in the form of a connection interface) for connecting the apparatus to a communications network.

Preferably, the communications network is in the form of a telecommunications network.

Preferably, the network connecting means comprises a telephone line interface.

Preferably, the apparatus further comprises means (in the form of a connection interface) for connecting the apparatus to a personal computer.

Preferably, the apparatus further comprises means (in the form of a connection interface) for connecting the apparatus to a telephone.

Preferably, the telephone connecting means comprises an input/output interface.

Preferably, the apparatus further comprises means for transmitting stored user preferences to a remote location.

Preferably, the apparatus further comprises means (in the form of a detector) for detecting information transmitted with an incoming call request.

Preferably, the information includes at least one of the following details: the caller line identity (CLI), text information accompanying a CLI, the geographical origin of the call, distinctive ring data, and whether the call is a voice call or a data call.

Preferably, the configuration means enables the user to configure the apparatus via a telephone connectable to the apparatus.

Preferably, the configuration means is responsive to the user pressing particular combinations of keys on the telephone keypad.

Preferably, the configuration means comprises an interactive voice response system.

Preferably, the functionality of the apparatus is at least in part implemented in software running on a personal computer, the personal computer being connectable to a telephone.

Preferably, the preference database is located on a server.

Speaker/Microphone

Preferably, the apparatus further comprises a speaker and microphone.

Preferably, the processing means is adapted to enable a user to communicate directly with the caller using the speaker and microphone, in dependence on user preferences.

According to another aspect of the invention, there is provided a mobile telephone which incorporates an apparatus as herein described.

Telecommunication System

According to a further aspect of the invention, there is provided a telecommunications system, which comprises: a server running a preference database containing information relating to a plurality of user's preferences regarding the handling of calls from particular callers and at least one apparatus as herein described.

Preferably, the or each apparatus is connected to the server via a communications link.

Preferably, the communications link is in the form of a telecommunications link.

Preferably, the telecommunications link comprises means for enabling the or each apparatus to dial into the server.

Preferably, the telecommunication link is in the form of a premium rate telecommunications link.

Preferably, the communications link is established in response to a request from the or each apparatus.

Preferably, the communications link is established in response to a request from the server.

Preferably, the server is adapted to prompt the or each apparatus to establish a communications link with the server.

Preferably, the communications link is established on a periodic basis.

Preferably, the apparatus further comprises means (in the form of a processor) for encrypting all content transmitted between the server and the or each apparatus.

According to another aspect of the invention, there is provided a system as herein described, which further comprises means (in the form of a processor) for synchronising information stored on the or each apparatus with information stored on the server.

Preferably, at least one of the following items is transferred from the server to the or each apparatus when a communications link is established between the server and the or each apparatus: updates to user preferences, configuration parameters, software updates, and pre-recorded voice messages and/or IVR prompts.

Preferably, at least one of the following items is transferred from the or each apparatus to the server when a communications link is established between the or each apparatus and the server: incoming call audit reports, outgoing call reports, telephone voice recordings, voicemail messages, instructions to send alerts to the user, apparatus performance information, and error log details.

Preferably, the system further comprises an interface to an email system.

Preferably, the system further comprises an interface to an Internet Instant Messaging system.

Preferably, the system further comprises an interface to a short message service system.

Preferably, the system further comprises an interface to a wireless communications system.

According to another aspect of the invention, there is provided a telecommunications system which comprises: a preference database containing at least one user's preferences relating to the handling of calls from particular callers, means (in the form of a processor) for processing calls placed to the or each user based on each respective user's preferences, means (in the form of a processor) for analysing calls placed to the or each user, and means for updating the or each user's preferences in dependence on changes to the preference database.

According to yet a further aspect of the invention, there is provided a telecommunications network, which comprises a plurality of users connected to the network, a preference database containing at least one user's preferences relating to the handling of calls from particular callers, means (in the form of a processor) for processing calls placed to the or each user based on each respective user's preferences, means (in the form of a processor) for analysing calls placed to the or each user, and means for updating the or each user's preferences in dependence on changes to the preference database.

Phone Bill Verifier per se

According to a further aspect of the invention, there is provided a telecommunications system, which comprises means (in the form of a receiver) for receiving outgoing call cost reports from a plurality of users, means for analysing the outgoing call cost reports, thereby to compare call costs on different networks, and means (in the form of a processor and associated memory) for providing users with comparative calling costs of different networks.

Incoming Call Auditing

According to a further aspect of the invention, there is provided a telecommunications system, which comprises means (in the form of a receiver) for receiving incoming call audit reports from a plurality of users, means for analysing the incoming call audit reports, and means (in the form of a processor) for aggregating the information contained within the incoming call audit reports to build up profiles of callers.

Preferably, the aggregating means comprises means (in the form of a processor) for identifying telemarketers that offend against telemarketing legislation, and wherein the updating means is adapted to update the database accordingly.

Preferably, the aggregating means comprises means for identifying persistent nuisance callers.

Preferably, the apparatus further comprises means (in the form of a switch) for automatically interrupting an existing telephone call with a further telephone call in dependence on the identities of the callers.

Call Waiting

According to another aspect of the invention, there is provided an apparatus for handling telephone calls which comprises: (optionally) means (in the form of a processor and associated memory) for configuring the operation of the apparatus based on user preferences relating to the handling of calls from particular callers, means (in the form of a memory) for storing the user preferences, means (in the form of a processor) for processing incoming calls based on the user preferences, and means (in the form of a switch) for automatically interrupting an existing telephone call with a further telephone call in dependence on the identities of the callers.

Current call waiting facilities are difficult to use since it is often awkward to interrupt your own conversation in order to determine who is on the second line. In contrast, by providing means for automatically interrupting an existing telephone call with a further telephone call in dependence on the identities of the callers, the invention may provide more effective call waiting functionality.

Preferably, the configuration means enables a user to specify rules relating the allowability of interruptions from further telephone calls during existing telephone calls.

Preferably, the rules relate to the relative importance of callers.

Preferably, the rules relate to the relative urgency of calls.

Preferably, the apparatus further comprises means for generating a message to the existing caller when the existing call is interrupted.

Preferably, the apparatus further comprises means for accepting the further telephone call following the interruption.

More preferably, the accepting means comprises an interactive voice response (IVR) system.

The use of an IVR system may improve the usability of the apparatus since a user is not required to memories complicated keystrokes to place one caller on hold and accept the new caller.

According to another aspect of the invention, there is provided an apparatus for handling telephone calls which comprises: means (in the form of a switch) for automatically interrupting an existing telephone call with a further telephone call in dependence on the identities of the callers.

According to another aspect of the inventions, there is provided a server for use in a telecommunications system which comprises: means (in the form of a memory) for storing user preferences relating to the handling of calls from particular callers in a preference database, and means for transmitting updated user preferences to users in dependence on changes to the preference database.

Preferably, the apparatus further comprises means for communicating with a similar apparatus, thereby to enable the or each apparatus to pass between one another information relating to the user preferences for the handling of calls.

Co-Operative Working Aspects

This important aspect is provided independently. According to a further aspect of the invention, there is provided an apparatus for handling telephone calls which comprises: means (in the form of a memory) for storing user preferences relating to the handling of calls, and means (in the form of a communication interface) for communicating with a similar apparatus thereby to enable the or each apparatus to pass between one another information relating to the user preferences for the handling of calls.

Preferably, the user preferences indicate the availability of the user for receiving calls.

Preferably, the apparatus further comprises means (in the form of a memory) for storing the user preferences from another user's apparatus.

Preferably, the apparatus further comprises means (in the form of a processor and associated memory) for arranging a convenient time for users to call one another in dependence on each respective user's preferences for the handling of calls.

Preferably, the apparatus further comprises means (in the form of a processor and associated memory) for booking a callback to a particular user in dependence on that user's preferences as received from that user's apparatus.

Preferably, the apparatus further comprises means (in the form of a processor and associated memory) for booking a callback to a call centre in dependence upon agent availability at the call centre.

Preferably, the apparatus further comprises means (in the form of a memory) for logging call receipts for use in the booking of a ringback to the caller.

Preferably, the apparatus further comprises means (in the form of a networking interface) for networking the apparatus to a plurality of further apparatuses.

Preferably, the apparatus further comprises means (in the form of an interface) for indicating user preferences for the handling of calls to other users.

Preferably, the user preferences indicate the availability of the user for receiving calls.

More preferably, the interface is provided on an Internet web page hosted on a server.

Preferably, the communicating means is adapted to communicate via a server.

More preferably, the communicating means is at least in part controlled by a server.

According to another aspect of the invention, there is provided a telecommunication system which comprises: a call centre having means for logging calls from users and means for setting up callbacks to users in dependence on call centre agent availability, and wherein the users call the call centre via an apparatus as herein described.

The configuration means as herein described may be located in part within the apparatus and in part within the server, or may be located wholly within either the apparatus or the server.

Novel aspects and features of the apparatus and/or system described may equally be implemented within a server, and vice versa.

Hence, for example, the invention extends to a server for use in a telecommunications system which comprises: means (in the form of memory) for storing user preferences relating to the handling of calls from particular callers in a preference database, and means (in the form of a transmitter) for transmitting updated user preferences to users in dependence on changes to the preference database.

Further features of the invention are characterised by the appending claims.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, apparatus or system aspects may be applied to methods, and vice versa.

Furthermore, features implemented in hardware may generally be implemented in software, and vice versa. Any reference to software and hardware features herein should be construed accordingly The invention will now be described, purely by way of example, with reference to the accompanying drawings, in which.

Figure 1:
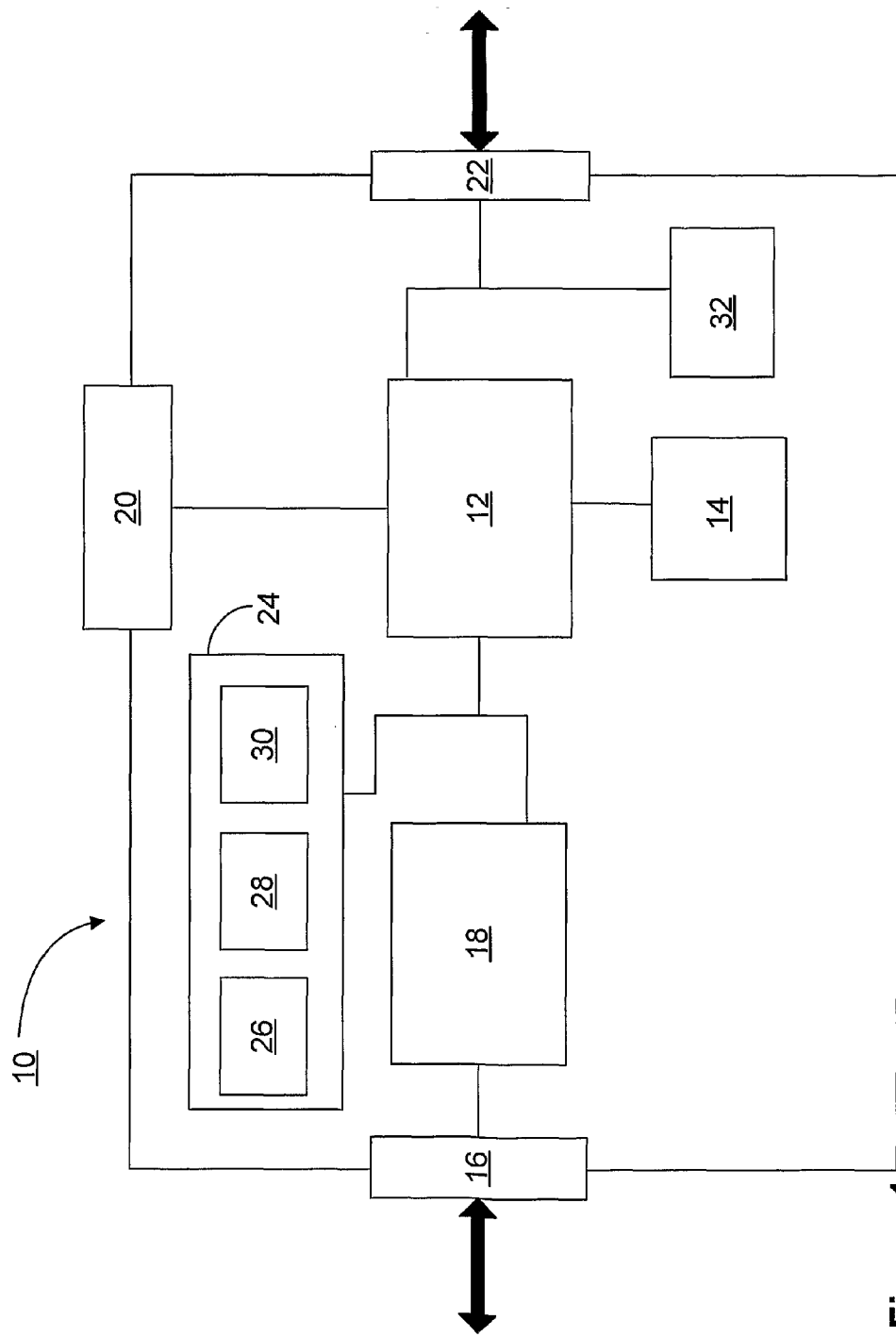
FIG. 1 shows a diagrammatic representation of an apparatus for handling telephone calls.

Referring to the drawings, FIG. 1 shows an apparatus 10 for handling telephone calls. The apparatus 10 comprises a processing means in the form of a microprocessor 12, connected to a memory store 14, which comprises both RAM and ROM (at least some of which is non-volatile). The memory store 14 is capable of storing user preferences relating to the desirability of accepting calls from particular callers, as well as configuration information, voicemail messages and other content and/or information, as discussed in more detail below.

The apparatus 10 further includes means for receiving updates to the user prefererces, in the form of a communications interface, which in this embodiment is in the form of a telephone network line interface 16. The telephone line interface 16 is also suitable for receiving incoming calls (as discussed in more detail below). The telephone line interface 16 is also suitable for transmitting and receiving other information and/or content to and from the apparatus 10.

The telephone line interface 16 is connected to the microprocessor 12 via detecting means, in the form of a detecting circuit 18, capable of detecting information transmitted together with an incoming call request. The detecting circuit 18 is able to detect any information which accompanies an incoming call, such as the CLI (caller line identity), any text information accompanying the CLI, the indication of geographical origin, distinctive ring data, and whether the call is a voice call or a data (fax) call.

The microprocessor 12 is also connected to a reader, in the form of a card reader 20, for reading information off a bar card, smart card, RFID transponder or the like.

The apparatus 10 also includes means for connecting the apparatus 10 to a telephone, in the form of a telephone handset interface 22. This enables the microprocessor 12 to route calls from the telephone line interface 16 through to a telephone handset connected to the handset interface 22. The telephone handset interface 22 also enables the handset to communicate with the apparatus via a telephone handset keypad or via signals received from a telephone handset microphone.

The apparatus 10 further includes means for answering telephone calls, in the form of a call answering module 24, which comprises an IVR (interactive voice response) module 26, a voicemail module 28, and a speech recognition module 30. Each of these modules 26, 28 and 30 are connected via the answering module 24 to the microprocessor 12.

The apparatus 10 also includes a speaker and microphone module 32 which is also connected to the microprocessor 12.

The apparatus 10 also provides call waiting functionality, as will be described in further detail below.

Figure 2:
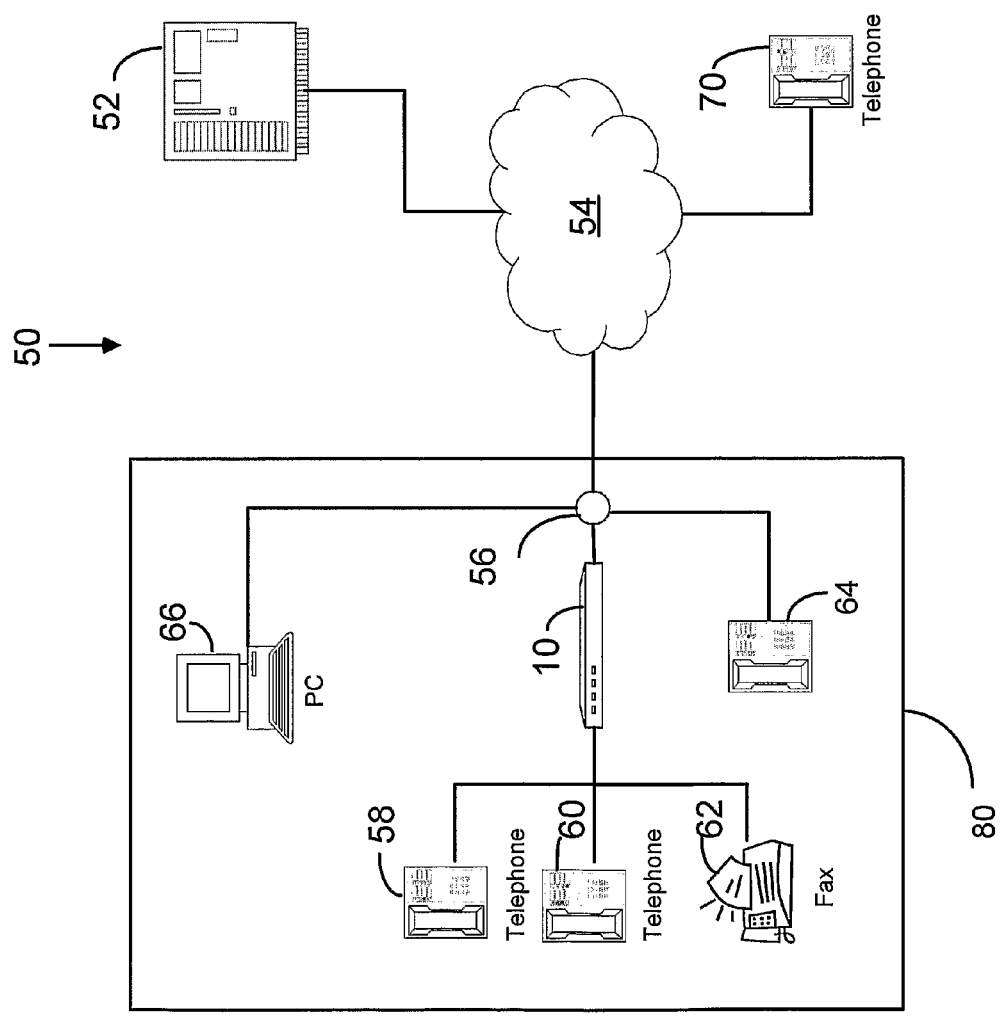
FIG. 2 shows a schematic diagram of a telecommunications system.

Referring now to FIG. 2, a telecommunications system, generally indicated by reference numeral 50, is shown. The telecommunications system 50 includes a server 52 which is connected to a telecommunications network 54. The server 52, amongst other programmes, runs a central preference database containing information relating to a plurality of user's preferences relating to the handling off calls from particular callers (or parties).

The telecommunications system 50 also includes an apparatus 10 connected via its telephone line interface 16 to the network 54 at a residential telephone line 56.

Two telephone handsets 58, 60 and a fax machine 62 are connected to the handset interface 22 of the apparatus 10. A personal computer 66 is connected to the same telephone line 56 as the apparatus 10 (via a suitable adapter). The handsets 58, 60, the fax machine 64 and the personal computer 66 are all located within a single user's residence 80. A further telephone handset 64 is also shown, which is directly connected to the telephone line 56.

Another user, represented by telephone handset 70, is also shown connected to the network 54.

Configuration means, in the form of a software programme, for configuring the operation of the apparatus 10, runs in part on the server 52 and is also preloaded in the memory store 14 of the apparatus 10. The configuration means software program includes a user interface which is accessible via the Internet, and the server 52 is connected to the Internet via the network 54. Thus, a user is able to use the personal computer 66 to access the configuration means and configure the operation of the apparatus 10.

Thus, in this embodiment, the configuration means is in fact partly located on the server 52, partly located on the apparatus 10, and accessible using the PC 66.

The configuration means is connectable to the apparatus 10 via the network 54, telephone line 56 and telephone line interface 16, as explained below.

The configuration means enables a user to configure various advanced call handling functions (as discussed in more detail below) relating to the apparatus 10. Once a user completes the configuration of the apparatus 10 using the configuration means, and logs off from the server 52, the server updates the configuration of the apparatus 10. In particular, the server 52 sends a message to the apparatus 10, via the network 54 indicating that the apparatus 10 configuration has been updated. The apparatus 10 then dials into the server 52, via the network 54, and a communication link is established between the apparatus 10 and The server 52.

A key problem encountered when using a conventional telephone call handling system is the relatively poor user interface provided by a telephone handset. In contrast, this system 50 provides advanced facilities for managing telephone communications via a rich full user interface, thereby enabling a user to configure the advanced functionality of the apparatus 10.

The apparatus dials into the server 52 using a premium rate telephone number, a free-phone number or a PSTN number, depending on the level of functionality and service that the user has subscribed to.

It is also possible, in certain circumstances, for the apparatus 10 to initiate the establishment of a communication link with the server 52 (as discussed in more detail below), and for a communication link to be established between the server 52 and apparatus 10 on a periodic basis, in which case the periodicity of the connection is programmable by the user via the configuration means. The periodicity of the connection may also be a default setting or set by a system administrator.

The configuration means enables the user to specify different categories or types of callers along with specific user preferences for the handling of each of these respective categories of callers. Thus, for example, the user may specify that certain types of callers may be unconditionally accepted and/or rejected (so called "white" list and "black" list callers) as well as certain types of callers that a user is conditionally willing to accept ("grey" lists). These caller preferences are stored in the (central) preference database on server 52, along with the calling preferences of other users or subscribers to the system 50. These calling preferences are also stored in the non-volatile RAM of the memory store 14.

Furthermore, a user may also specify sophisticated processing rules for the handling of calls from different categories of callers, for example, the user may specify certain rules for the processing of all calls based on the time of day or the day of the week. The user may also specify that certain types of calls are accepted at all times and that others are only accepted at predetermined times of the day, or that certain types of calls are handled in a certain predetermined fashion at certain times of the day, for example, calls from telemarketers may be handled using the IVR module 26 during the evening, but allowed to ring through to handsets 58, 60 during working hours.

The configuration means also enables a user to specify that all numbers dialled out by the user are automatically added to a generic 'allowed callers' category.

The configuration means also enables the user to adopt the calling preferences of other users. In particular, a user may decide to allow all calls allowed by another user, for example a family member, friend or colleague. Equally, the user may decide to reject all calls rejected by another user. These preferences are then stored in the memory store 14 of the apparatus 10, and when the detecting circuit 16 detects the CLI of an unwanted caller, this call can be automatically, terminated, or handled in some other fashion, as described in FIG. 3.

The preference database (and the apparatus 10) stores user preferences relating to the handling of calls from callers in particular categories by associating a caller type with a set of processing rules. The caller type represents the particular category of caller, for example, the following caller types may be identified by a user: family, friends, work colleagues, charities, market researchers, utility companies, companies the user is willing to receive calls from, companies the user is not willing to receive calls from, and telemarketers. The user then specifies processing preferences for handling calls from each of these respective types of callers. Alternatively, the user may use default rules for processing calls of a certain category.

In an embodiment, a data structure comprising two fields is used to store the telephone number, name, CLI, partial number match, or wildcard characters associated with a particular caller along with the caller type or category information associated with the particular caller.

The configuration means may also allow a user to incorporate callers listed in another user's categories into his own similar categories, for example, a user may add all of the family members listed in a sibling's family category to his own family category. In this regard it is important to note that once a caller, say, a family member, is added to the user's own (family) category that caller will, by default, be handled in accordance with the processing rules specified by the user for handling calls in that category. However, it is also possible to adopt the list of callers in another user's category along with the other user's call handling preferences for those callers, in which case such callers are handled in the same way they are handled by the other user. Conversely, it is possible to incorporate only a set of processing rules specified by another user to cover a particular category of caller; for example, if a user were to find out that another user were receiving, say, one call per week from charities, the user may decide to adopt the particular processing rules applied by that user to charity callers in order to replicate the performance achieved by the other user.

In addition, the configuration means also enables a user to subscribe to particular user groups, having particular preferences for the way calls from particular callers are handled. In this case calls to the user are handled in accordance with the groups calling preferences. Thus, for example, if the group unconditionally rejects all callers of a particular type, such callers will also be automatically rejected by the user.

It is important to note that modifications to the call handling preferences of the group that a user has subscribed to and/or any call handling preferences of a particular user that have been adopted by the user are automatically incorporated into the user's calling preferences. The changes are incorporated when the apparatus 10 is next connected to the server 52. Typically, a change in adopted calling preferences or a subscribed group's calling preferences will cause the server 52 to prompt the apparatus 10 to dial in and thereby receive the updated calling preferences.

The apparatus 10 stores in the memory store 14 a complete audit of the handling of all incoming calls. This audit data is transmitted to the server 52 when the apparatus 10 is connected to the server 52. The server 52 comprises means for aggregating the call audit reports of all users of the system 50, and in this way can build up profiles of callers, and identify nuisance callers and/or telemarketing callers that do not comply with legislation. Such information may be used as evidence in the prosecution of telemarketers and/or nuisance callers. The user may specify, when first setting up the apparatus, that they are registered with a particular call suppression service, for example, the UK telephone preference service (TPS) of the US Federal "Do not call" list. In which case, evidence relating to callers who offend against the rules of such suppression services is gathered by the server 52, as described above, and may be used in the prosecution of such offending callers.

The server 52 also builds up lists of different types and/or categories of callers, for example, utility companies, charities, market research organisations, and the like.

The user is thus able to specify, via the configuration means, particular categories of callers and how calls from callers belonging to such categories should be handled, for example, the user may specify that he is willing to receive calls from charities, but not willing to receive any calls from utility companies. The configuration means also includes a setting that enables a user to specify that he will not receive any calls from callers identified by the system 50 to be nuisance callers.

As the lists of callers maintained by the server 52 are updated, these changes are passed on to the user's preferences when the apparatus 10 next connects to the server 52, as described above.

The server 52 also enables a user to specify, via the configuration means, that he is willing to receive telemarketing calls in certain circumstances, for example, if he is financially compensated for such calls. Alternatively, a user may specify that he is willing to receive telemarketing calls so long as the company making those calls is willing to compensate a third party, such as a charity, in return for the user accepting such calls.

If companies are willing to pay users to listen to a sales pitch over the phone it would be more likely that the topic of the call would be of interest to the user.

The system 50 thus facilitates a paid telemarketing scheme, which allows certain calls to bypass the call barriers that the system 50 erects, in exchange for compensation being awarded to the user.

The configuration means further enables the user to configure the apparatus 10 to process incoming calls based on at least one of the following criteria: the date, the day of the week, the time of day, the geographical origin of the call, any distinctive ring data, and whether the call is a voice call or a data call.

Thus, the user may specify that all callers, or certain categories of callers, will be handled in certain ways depending on the time of day, or day of the week.

The status of the apparatus 10 may also be used in the handling of incoming calls, for example, if the voicemail memory is full, an incoming call will not be diverted to voicemail.

The apparatus 10 is also able to automatically classify incoming calls into a particular category on the basis of the way the user handles the call, for example, if a received call is rejected then that CLI can be added to the "companies the user is not willing to receive calls from" category.

Using the information relating to the category or type of the incoming caller, along with the above criteria for handling incoming calls, the apparatus 10 is able to handle calls in accordance with a wide variety of processing rules. Purely by way of example, the following examples of the sorts of processing rules that may be applied to callers are provided:

- If the incoming call is a charity call received between 8 pm and 9 pm in the evening let it ring through, otherwise play a message saying "We only accept solicitation calls from charities between 8 pm and 9 pm".
- If the incoming call is from a member of the family or a friend then allow the call waiting service to interrupt a current call.
- If it is a Sunday morning only allow calls from friends, family and payphones.
- Send all payphone calls to voicemail.
- Do not allow a charity to ring through if they have been spoken to in the last 6 months.
- If the answering machine memory is full then any calls destined for the answering machine should ring through.
- If a call has lasted more than 1 hour then allow any call coming through on call waiting to ring the apparatus 10 speaker 32 (i.e. the apparatus presumes that a user has left one of the handsets off-hook).

CLI information, in part, enables the apparatus 10 to classify each incoming call as belonging to a particular category or type.

There are three different types of CLI information presented with a call:

1. CLI Number (Calling Line Directory Number Information)
   Number information may be full, partial or coded:
   Full—the callers full telephone number is received. For a company this is sometimes a central switchboard number.
   Partial—only part of a phone number is passed—for example numbers from France will just show the French international code '00 33'
   Coded—Calls where the CLI is unavailable are coded 'O', calls where the CLI has been withheld by the subscriber are coded 'P'
2. CLI Text (Caller Name/Text Parameter Information)
   There is provision for customised text to be sent as part of the CLI, as well as standard messages such as 'International', "Payphone" and "Ring-back call".
3. Call Type Information
   There are three different call types—'Voice call', 'Ring-back-when-free' call and 'message waiting' call. Further codes may be incorporated in the future such as 'Fax call'.

CLI (caller line identity) information is typically used to identify particular callers, and the apparatus 10 and server 52 make use of CLI information to handle and/or identify callers. Thus, typically the user stores callers of particular types or categories using CLI information. In addition, if CLI information is not available, or when CLI information has been withheld or is not recognized, this lack of CLI information is also used to process the call.

Note that if the user does not have a caller display service from their network provider (i.e. they get no CLI information with each call) then every incoming call is classified as 'Unrecognised CLI'.

The user is able to make use of text information that may accompany CLI information, to identify particular callers. Similarly, the server 52 may also use such information when monitoring and analysing calls received by users of the system 50.

In addition, it is also possible for the user to configure the apparatus 10 to identify calls having a particular sequence of numbers in part of the CLI, and/or particular characters in part of the text accompanying a CLI, using wildcard filtering; for example, a user may handle all numbers staring with "0033" (i.e. calls from France) in a particular fashion, or all numbers including the text glazing in the text accompanying the CLI may be terminated. In this way it is possible to handle all calls from a particular call centre or neighbourhood in a particular way.

The configuration means further enables the user to configure the apparatus 10 to route or divert incoming calls to at least one of the following devices: a particular telephone extension, a voicemail box in module 28, a facsimile machine 62, an interactive voice response system 26, a particular extension (telephone handsets 58, 60), a mobile telephone or an external landline telephone 70.

The apparatus 10 also stores a log of all outgoing calls, and the duration of all calls. This log is transmitted to the server 52 when the apparatus 10 is connected to the server 52. The server 52 then analyses the costs of outgoing calls made be different users and provides comparative feedback on the costs of using different network providers. Typically, the user will supply details of his or her network provider and call plan when signing up, which enables the server 52 to calculate the cost of calls made using the provider.

In one embodiment, the system 50 may enable outgoing calls to be routed based on cost, in which case outgoing calls made via the apparatus 10 incorporate an appropriate network access code, which is selected based on the comparative cost performance of different network providers and factors such as the time of day or geographical location of the party being called. The apparatus 10 is thus capable of storing a selection of access codes and selecting an appropriate access code in dependence on the aforementioned factors.

Furthermore, different access codes may be downloaded to the apparatus 10, when it is connected to the server 52, as different providers or price plans become available.

The apparatus 10 also includes a card reader 20 which enables information that alters the operation of the apparatus 10, to be provided to the apparatus 10 in the form of a physical card. In particular, the information may be in the form of configuration information, which alters the configuration of the apparatus 10. In addition, the information may be in the form of updates to user preferences, which are then stored in the memory store 14. Furthermore, the information may be in the form of an instruction for the apparatus to perform a transaction, for example, to pledge to make donation to a particular charity.

The provision of the microphone and speaker module 32 enables calls to be routed directly to this module 32 as appropriate. Thus, as briefly mentioned above, if a handset has been left off-hook, an incoming call can be routed to ring on the microphone/speaker module 32, to enable a user to still receive incoming calls.

Furthermore, the user can configure the apparatus 10 to allow certain users to be routed to and picked up using the speaker/microphone module 32, in the event that their call has not been answered within a predetermined number of rings. This enables a caller to communicate directly with the user even if the user does not answer the phone. Such a facility Would be beneficial to elderly or infirm people who may have become incapacitated for one reason or another.

Aspects relating to the call answering module 24 are now described in further detail.

The call answering module 24 is capable of answering incoming calls when required and then handling those calls in accordance with user preferences. Thus, for example, if a user specifies, via the configuration means, that unknown callers should be screened before the calls from unknown callers are routed to the telephone extensions 58, 60 the answering module 24 will answer the call with an appropriate IVR set of prompts, using the IVR module 26, and request the caller to provide certain information. This information is then stored by the apparatus 10 in the memory store 14.

Figure 11:
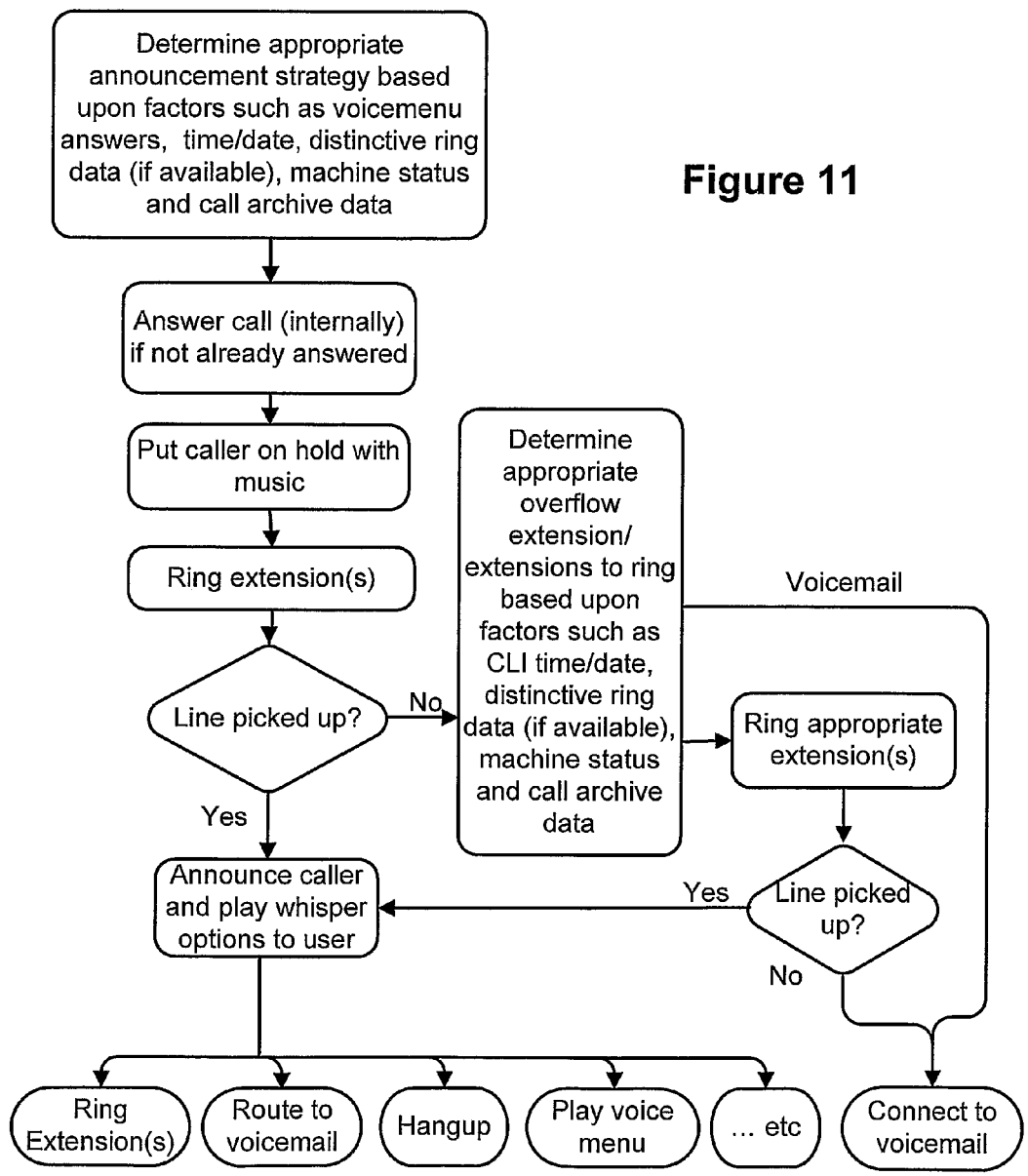
FIG. 11 shows a flow chart describing the announcement of incoming calls.

The apparatus then routes the call based on the information provided by the caller, as shown in FIG. 11.

The information provided by the caller may also be used in an announcement message (or so called "whisper message") that may be played to the user before accepting a call.

It is also possible for a caller to provide information to the answering module 24 via the selection of keys on a touch-tone keypad or by verbal responses to the IVR system. Thus, a caller may, for example, be asked to state his or her name, which may be recorded and subsequently played back to the user as part of an announcement message.

The speech recognition module 30 enables the apparatus 10 to recognise responses provided by a caller and to handle calls appropriately based on responses provide by the caller. Thus, the apparatus 10 is able to solicit information from callers via voice responses and/or via the key presses on a telephone keypad.

As mentioned above, the apparatus 10 stores a complete audit of the handling of all incoming calls, for example, whether the call was routed to voice mail, routed directly to an extension or terminated. This historical or audit information may then be used in the processing of incoming calls, for example, a user may specify that all unknown callers will be routed to voicemail at certain times of the day, but that if an unknown caller calls more than three times within a specific period, and does not appear to be a telemarketing call, then such a caller should be routed directly through to one of the telephone handsets 58, 60.

Further aspects relating to the handling of incoming calls and outgoing calls as well as the routing of calls and the handling of faxes and alerts are described in some detail with reference to FIGS. 3 to 12 of the drawings.

Figure 3:
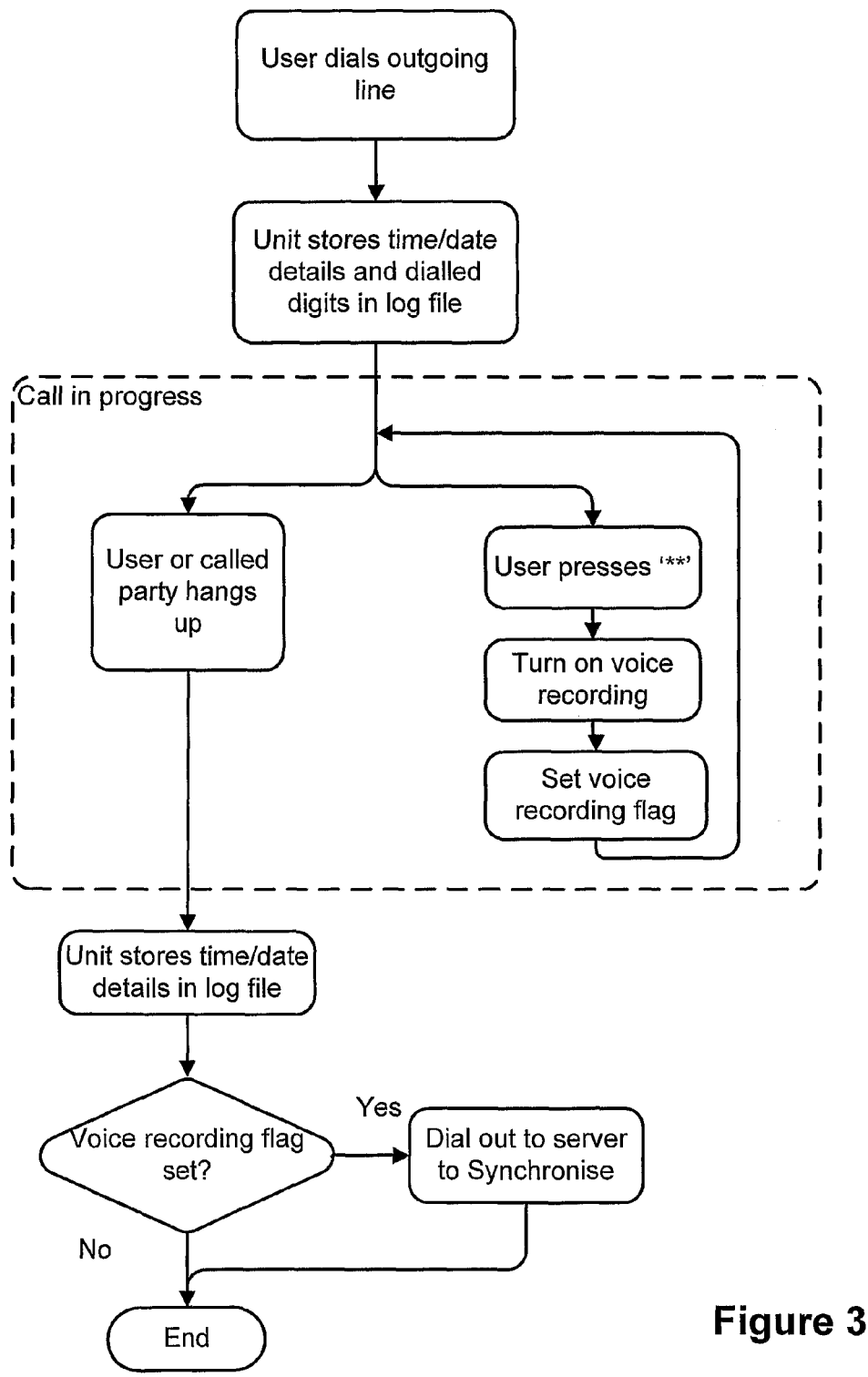
FIG. 3 shows a flow chart describing outgoing call processing.

FIG. 3 describes outgoing call processing as well as the recording of voice calls. In particular, the apparatus 10 stores in the memory store 14 details relating to the outgoing call which are later transferred to the server 52, when the apparatus is next connected to the server 52.

As shown in FIG. 3, the apparatus is also capable of recording a voice call. In this embodiment, the recording functionality is activated when the user presses the "star" key on the telephone handset twice.

Figure 4:
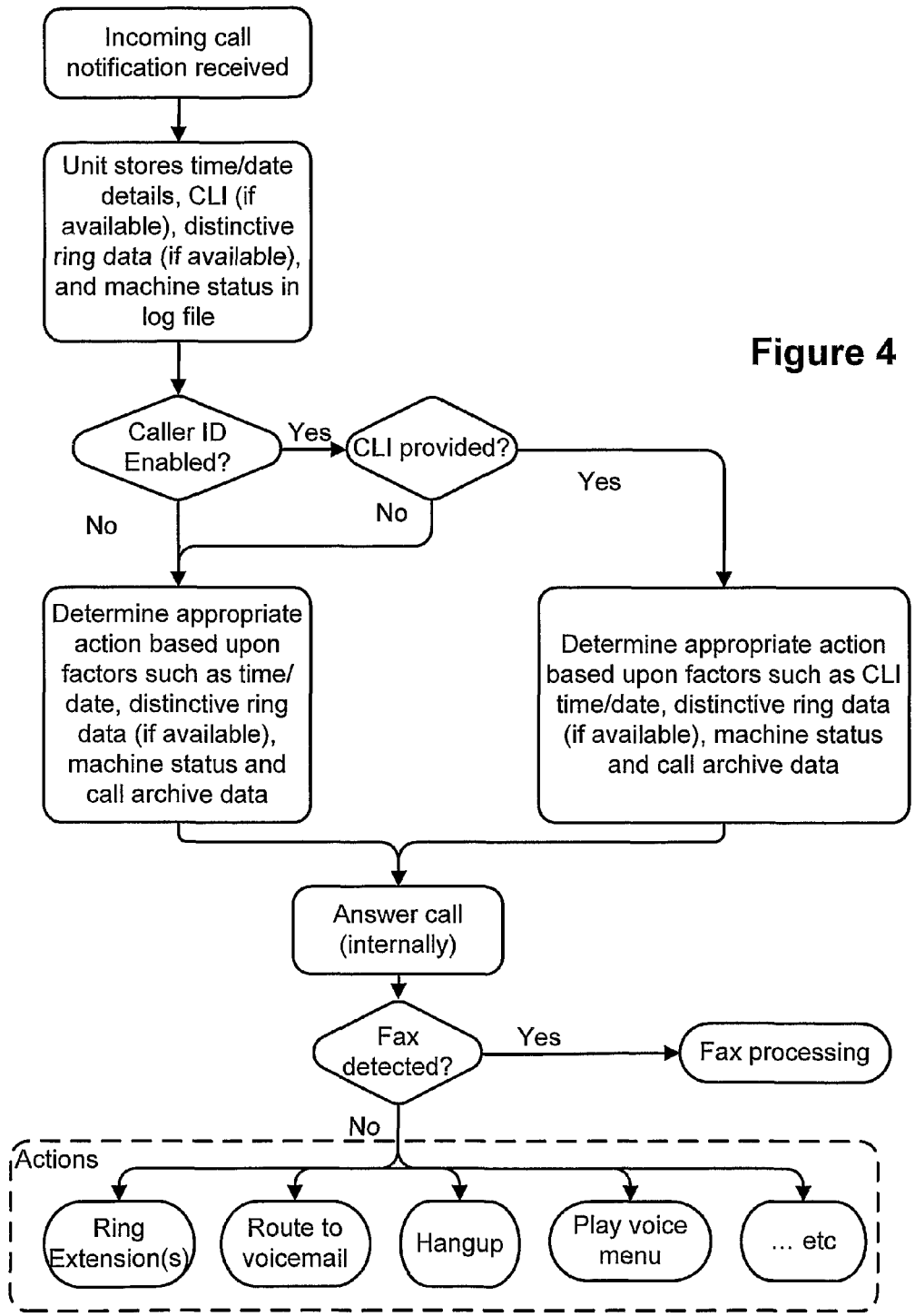
FIG. 4 shows a flow chart describing incoming call processing.

FIG. 4 describes the handling of incoming calls, in accordance with user preferences. As shown in FIG. 4, incoming calls are handled in accordance with user preferences, which are based on the type of call, which may be determined using CLI and/or other information, as well as the time and date of the call, archive data (i.e. whether the particular caller has called previously, and how the call was handled), the status of the apparatus (i.e. whether the memory store 14 can accommodate further voicemail messages), and the like. This information is then used to handle the incoming call appropriately.

Figure 5:
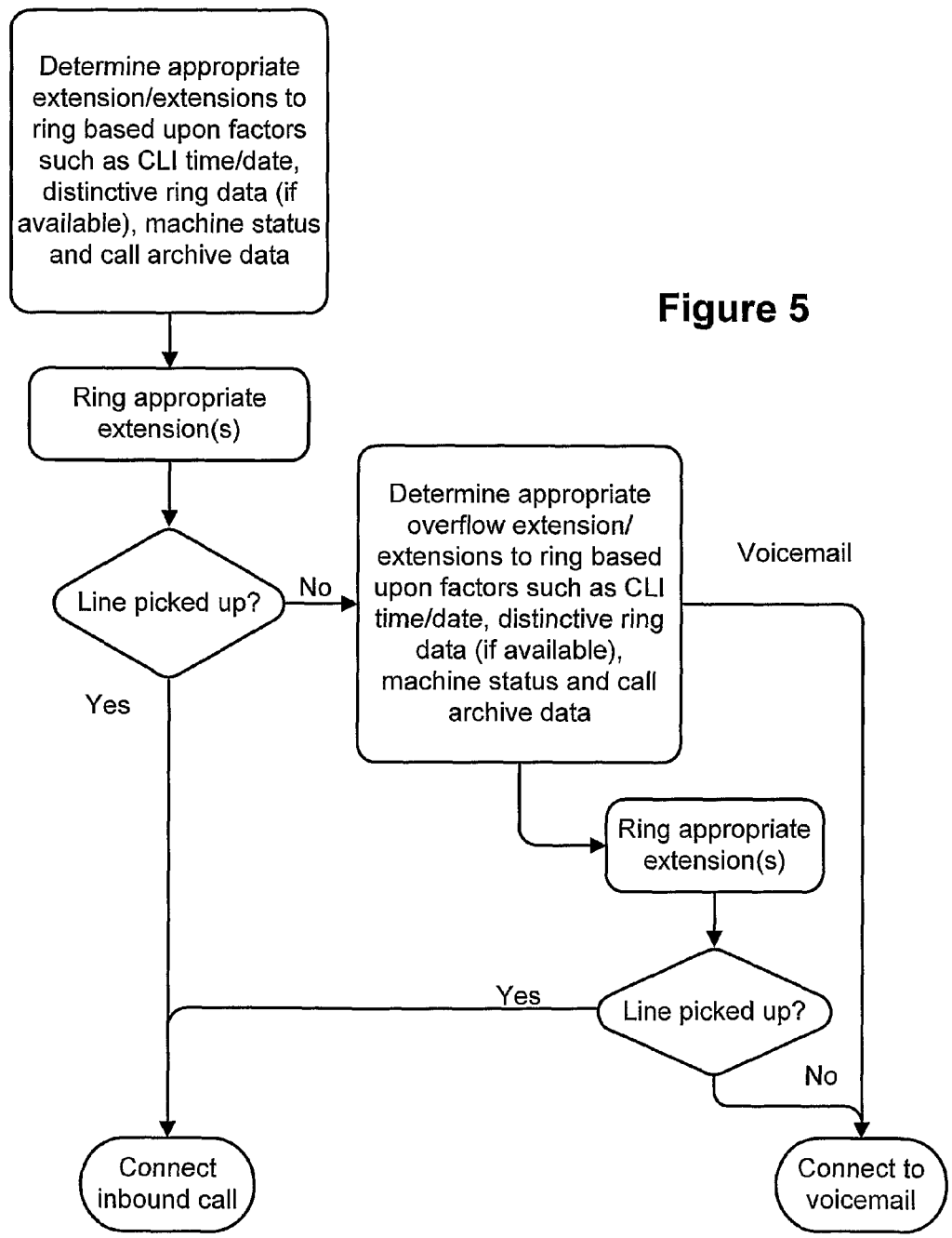
FIG. 5 shows a flow chart describing extension ringing.

FIG. 5 describes the ringing of extensions—without announcement.

Figure 6:
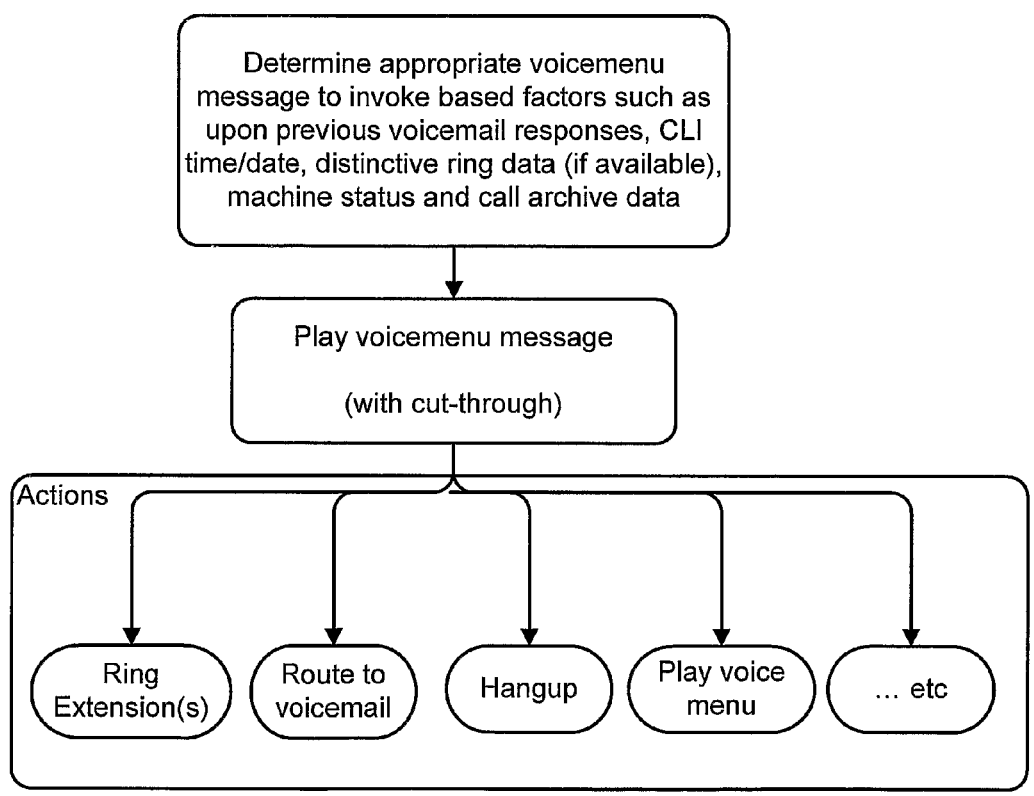
FIG. 6 shows a flow chart describing voice-menu operation.

FIG. 6 describes the operation of a voice-menu (or IVR system 26).

Figure 7:
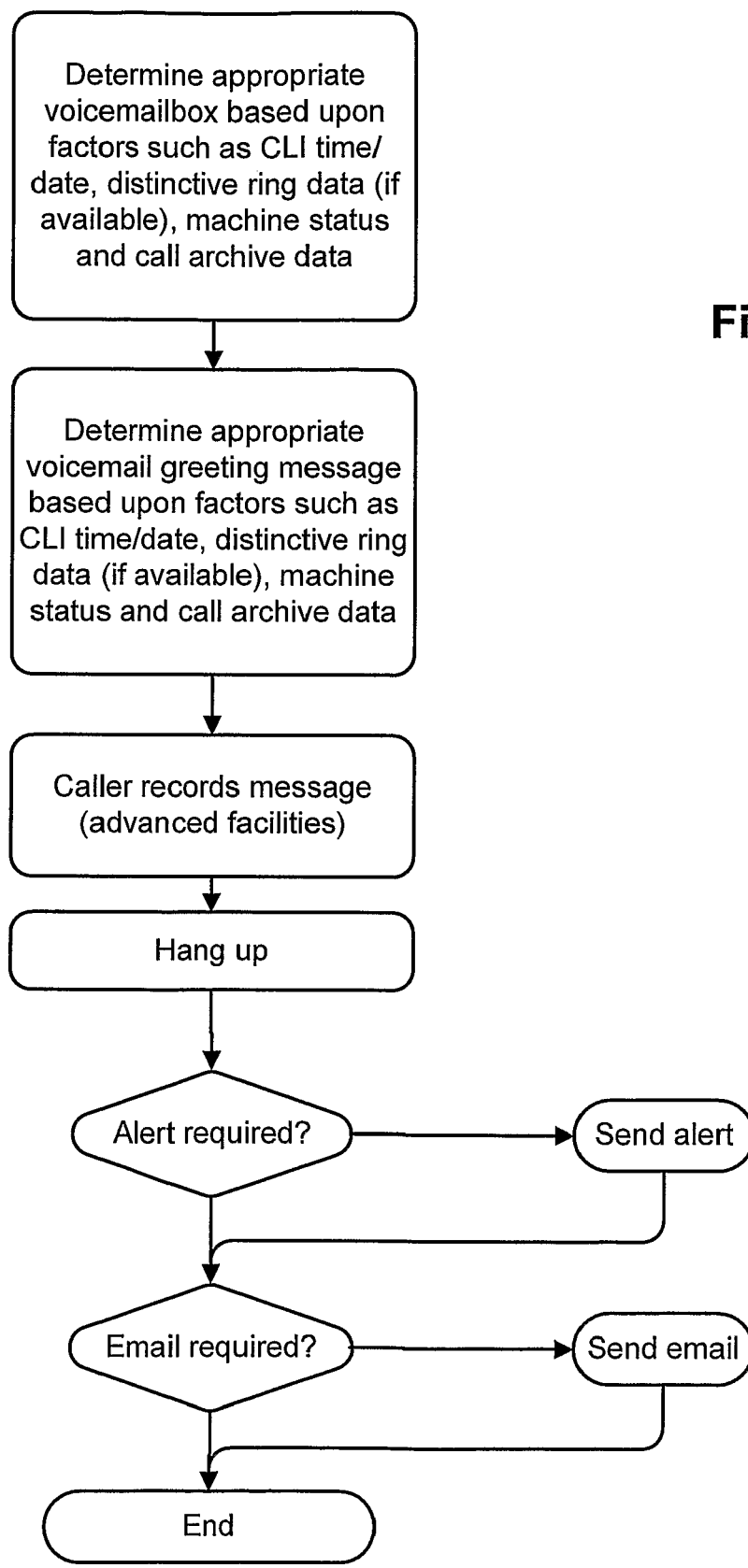
FIG. 7 shows a flow chart describing voicemail operation.

FIG. 7 describes the saving of voicemail messages using the voicemail module 28. As shown in FIG. 7 it is also possible for a caller to request that an alert be sent to the user indicating that a voicemail has been left. The transmission of alerts is described below with reference to FIG. 10.

Voicemail messages may be stored in the memory store 14 of the apparatus, or may be uploaded to the server 52, when the apparatus is connected to the server 52 and stored on the server 52.

Figure 8:
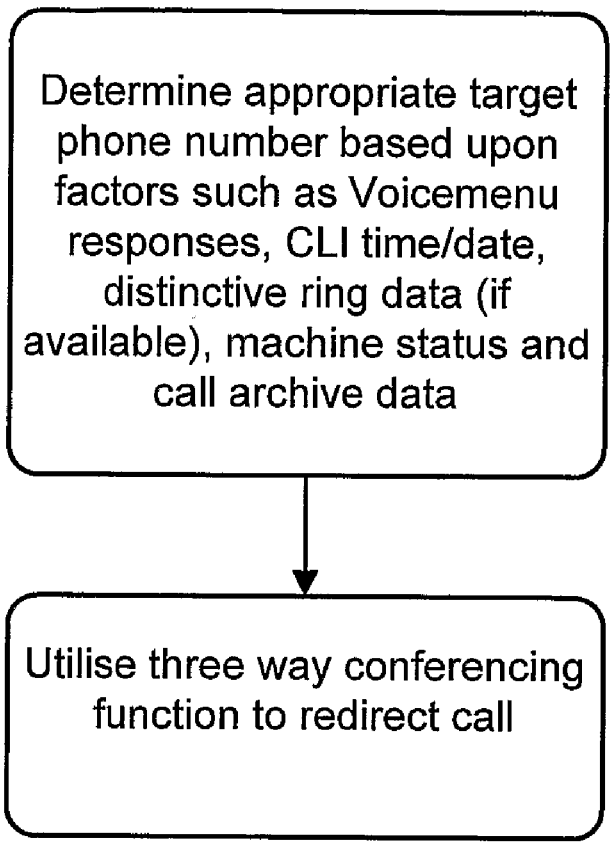
FIG. 8 shows a flow chart describing call redirection.

FIG. 8 describes call redirection.

Figure 9:
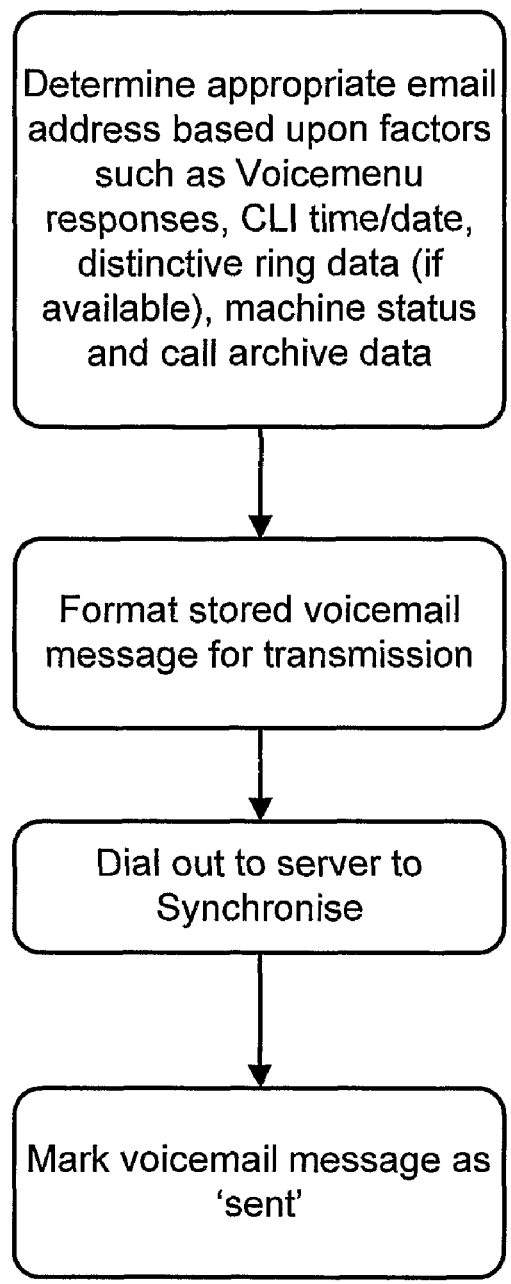
FIG. 9 shows a flow chart describing email transmission.

FIG. 9 describes the sending of voicemail messages via email. As shown in FIG. 9, a voicemail message may be forwarded to an appropriate email address for later retrieval by the user.

Figure 10:
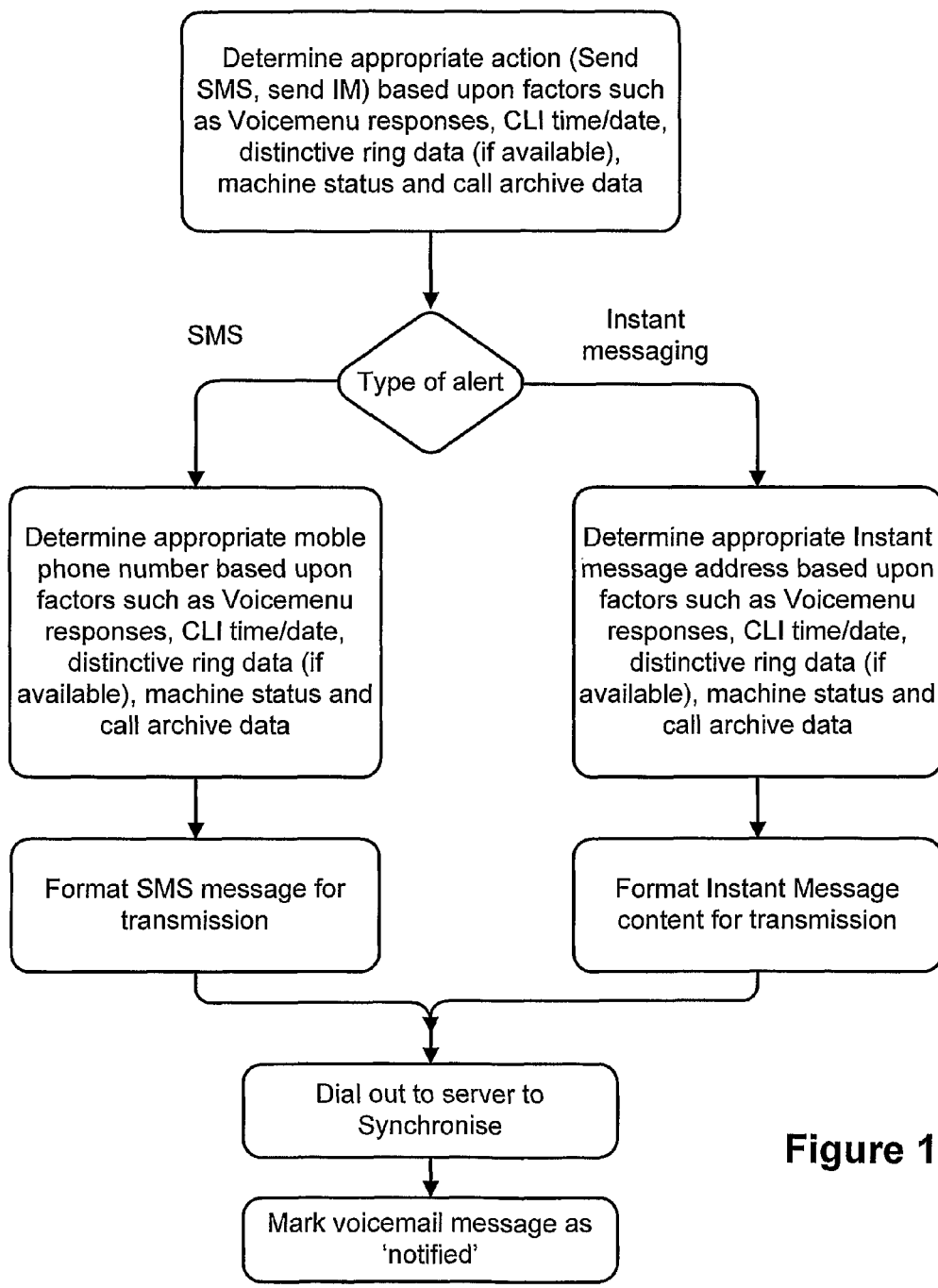
FIG. 10 shows a flow chart describing the transmission of alerts.

FIG. 10 describes the transmission of alert messages, either by SMS (short message service) or via IM (internet instant messenger). Alerts may also be sent to a pager or other wireless device.

FIG. 11 describes the operation of the call answer module 24 and the IVR system 26.

Figure 12:
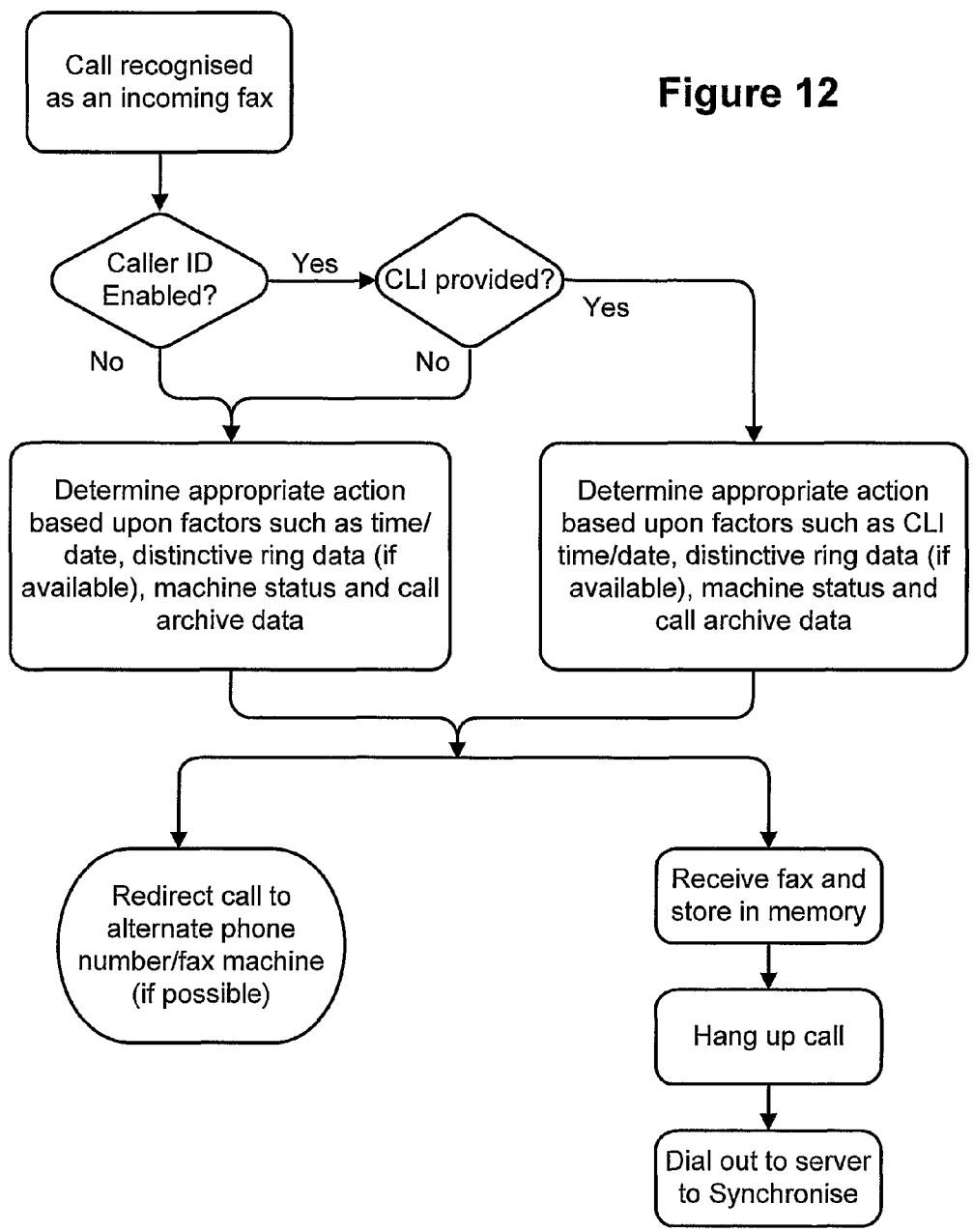
FIG. 12 shows a flow chart describing fax processing.

FIG. 12 describes the processing of incoming fax transmissions.

In summary, the apparatus 10 may handle incoming calls in any of the following ways:

- Allow the call to ring through at all extensions (or handsets 58, 60) in the residence or home
- Allow the call to ring through to a particular extension, say, handset 58, in the residence or home
- Allow the call to ring through to a particular extension, say, handset 60, with a particular distinctive ring
- Play a message to the caller requiring them to press a button to confirm that they are not a telemarketer
- Play a message to the caller requiring them to enter a numeric code using their touch tone phone before the call rings through
- Require the caller to state their name, put them on hold then ring one or many extensions in the house. When the call is picked up play the message and allow the user to accept the call or route it to voicemail
- Hang up the line (no phones ring in the house)
- Play a message then hang up the line (no phones ring in the house)
- Send the call to a specific voicemail box (no phones ring in the house)
- Redirect the call to another number (mobile or landline)
- Do not allow this call to interrupt an established call via 'call waiting'

Clearly it will be appreciated that the above list is non-exhaustive.

Further aspects of the apparatus 10 and/or system 50 are now described.

Whisper Facilities

As mentioned above, a call announcement or "whisper message" may be given to the user when an incoming call is received, for example "Your bank is on the line". The user can then determine how the call should be handled, for example, to allow the call through or to route it to voicemail. The user could also redirect the call to a mobile phone or instruct the apparatus 10 to play a message to the caller explaining that the user does not accept solicitations. The details announced to the user may be obtained directly from the caller, for example, when the apparatus 10 answers the call it may ask the caller to state their name, which is recorded and then played back to the user as part of the announcement message. Information obtained from callers can also be stored in the form of a list of recordings either in the memory store 14 or on the server 52. These recording can then subsequently be used to announce such callers to the user in the future.

Text to Speech

The apparatus is capable of translating text to speech—for example, if a call is received that has a CLI text that says "Jim Smith" then the text to speech facility can use the whisper facility to announce that "Jim Smith is on the line". Furthermore, if the apparatus 10 has downloaded all the CLIs used by charities in the UK along with their names then when a call is received from one of these charities the name retrieved from the CLI number list could be played back using text to speech.

Caller Waiting Management

The apparatus 10 is able automatically to interrupt an existing conversation (for caller types where this has been authorised), place the current caller on hold and then whisper the name of the new caller to the user. This is handled using the IVR module which enables the user to select an approach for handling the new caller, for example, the user may decide to accept the new caller, or to divert the new caller to the voicemail system.

IVR Facilities for Interrogation and Configuration Management

The apparatus 10 may be configured by the user directly using a telephone handset 58 connected to the apparatus 10. In this case, the user picks up the telephone handset 58, keys in a particular combination of keys thereby activating the configuration means on the apparatus, which then initiates a login or authentication routine via an IVR system. Once the user has logged onto the configuration means of the apparatus an IVR menu system is activated that allows the user to interrogate the apparatus 10 and to alter the configuration of the apparatus. Authentication may be by voice recognition or via a pass code keyed into a telephone (touchtone) keypad.

Remote Access

The user can access the system 50 and the apparatus 10 from a remote location. In particular a user can use a remote telephone handset to dial into the apparatus 10 via the system 50. In one embodiment, the user accesses the apparatus via the server 52, in which case the user first dials into the server 52, logs onto the server, and then requests the server to prompt the apparatus to dial into the server 52. Once a connection has been established, the user can access the call answering module 24 and retrieve voicemail messages. The user can also then interrogate or configure the apparatus 10, using the remote telephone handset, as described above.

Mobile Telephone Implementation

The apparatus 10 may be implemented in software running on a mobile telephone handset, and the system may be implemented using existing mobile communication network infrastructure.

Network only Service

The system and apparatus may be implemented as part of a telecommunications network, without the need for customer premises equipment.

Apparatus Reports its Own Errors

The software running on the apparatus 10 is written so that unexpected events will not cause the core code to crash. If a software error is detected then details are written to an error log in memory and as soon as possible the apparatus 10 synchronises with the server 52 to report the error. If the error can be fixed by a software upgrade then this will be downloaded to the apparatus 10 at the next opportunity (by a server initiated synchronisation).

Off-Hook Detection

If a call has lasted more than, say, 1 hour (or some other predetermined time interval) then the apparatus 10 will allow any further incoming calls (which would normally be handled using the call waiting functionality) to ring the speaker 32 of the apparatus 10 to alert the user that a telephone handset has been left off-hook.

Failover

The apparatus 10 is powered using an external mains connection. However, in the event of an interruption in the power supply to the apparatus 10, a POTS handsets connected to the apparatus 10 is still able to access the telephone line and make and receive calls, due to the wiring configuration of the apparatus 10.

Outbound Call Management

The apparatus 10 can block outbound calls of certain types, or require authentication before it allows them to be made. Calls to specific numbers, specific number prefixes, specific geographic areas or countries, or the like may be blocked.

Call Classification

Once a call has been terminated the user may pick up the handset and access the apparatus directly using the IVR system (as described above). The user can then configure the apparatus 10 to handle the most recent call in a particular fashion; for example, the IVR system may provide the user with a selection of possible caller types or categories into which the most recent caller could be categorised.

Rapid Seizure of the Line

The apparatus 10 will seize the line immediately upon receipt of an incoming call request, thereby preventing handsets which are connected to other household extensions from "tinkling".

Network Connection

The link from the apparatus 10 to the server 52 may be via a network connection and/or a modem connection.

Providing users Access to their Own Calling Statistics

As mentioned above, data relating to the handling of incoming and outgoing calls is stored on the apparatus 10 and intermittently transmitted to the server 52. Thus, a user can log into the server 52 and access details relating to calls that have been made via the apparatus 10, and also view the audit data relating to the handling of all calls received by the apparatus. This enables a user to determine which calls he has not received (for example calls which have been terminated by the apparatus 10) and assess the performance and effectiveness of his configured call handling routines.

VoIP Phones

The system 50 and apparatus 10 are capable of working with calls received from or delivered to VoIP phones.

Further features relating to the transfer of content and/or information between the server 52 and the apparatus 10 are now described.

Server Synchronisation

Server 52 synchronisation occurs when the system unit (or apparatus 10) based in the user's residence connects to the server 52 via the Internet.

Triggering a Synchronisation

Three types of event can cause this to happen:

1. Timed Synchronisation

The system unit (or apparatus 10) dials out to the server 52 on a regular basis to synchronise (say, once per week).

2. Client Driven Synchronisation

An action on the system unit (or apparatus 10) triggers a synchronisation—for example, a fax message is received, the system unit's memory reaches a critical level or a voicemail message that requires an alert be sent to a user.

3. Server Driven Synchronisation

Some action on the server 52 triggers a synchronisation—for example, the customer logs onto the web and changes the configuration settings of their system unit (or apparatus 10).

In the case of server synchronisation, the server 52 uses an auto dialler to dial into the system unit (or apparatus 10) and instructs it to synchronise.

Examples of the type of information and/or content is passed between the system unit (or apparatus 10) and the server 52 during synchronisation include:

1. Information passed from the system unit (or apparatus 10) to the server:
   Details of all calls received (Inbound call log)
   Details of all calls made (Outbound call log)
   Telephone conversation recordings
   Voicemail messages
   Instructions to send alerts
   Performance information
   Error log details
2. Information passed from the server 52 to the system unit (or apparatus 10):
   Configuration parameters
   Program updates
   Professionally recorded voice prompts
   Indirect access codes
   Lists of telephone numbers and callers and associated call handling rules Synchronisation as a Payment Method If the unit (or apparatus 10) is required to dial a premium rate number to synchronise then this will generate income. Units may have a basic or advanced level of functionality and only those units that are synchronised regularly will offer the advanced functionality. This method of charging can be used for both regular payments (e.g. maintenance of advanced functionality) and ad-hoc payments (e.g. payment for the delivery of an SMS alert).

Further details of some of the facilities provided by the server 52 and/or the system 50 are now discussed.

Phone Bill Verification

During registration the user may provide the system with details of the phone company they use for their outbound calls and which tariff they have signed up for. Since the system unit (or apparatus 10) will report on all calls made from the customers home—the date/time of the call, the dialled number and the call duration—the server 52 can calculate what the customer's phone bill should be giving the customer the ability to reconcile their bills.

Switching Recommendations

Over a period of months the server can identify the pattern of calls that the user makes and, with reference to the tariffs of the various network providers, recommend the best option for the customer telling them how much they could save.

The system may even automatically switch customers between different network providers on a periodic or even a call by call basis, by uploading an indirect access prefix code to the apparatus 10 during synchronisation (or using another method).

Monthly Reports

The server 52 can send, the customer a monthly summary in an email telling them how effective the system unit (or apparatus 10) had been during the month—e.g. how many calls of different types the system unit (or apparatus 10) had blocked.

Professional Voice Recording

For customers who are uncomfortable recording their own answering machine announcements the user can specify the text of a message that a professional voice artist will record for them. This message will be downloaded to the apparatus 10 during a synchronisation.

Aggregation of Statistics

Anonymous statistics from a wide range of customers can be aggregated by the server 52 and used to identify nuisance callers. This information can be passed to the authorities. Users may be willing to do this because they want the companies who cause this nuisance to be punished.

Trust Groups

A community of users could be cultivated which developed trust groups i.e. if Alice, Bill and Carl form a trust group then any callers that Alice rejects will also be rejected by Bill and Carl.

Figure 13:
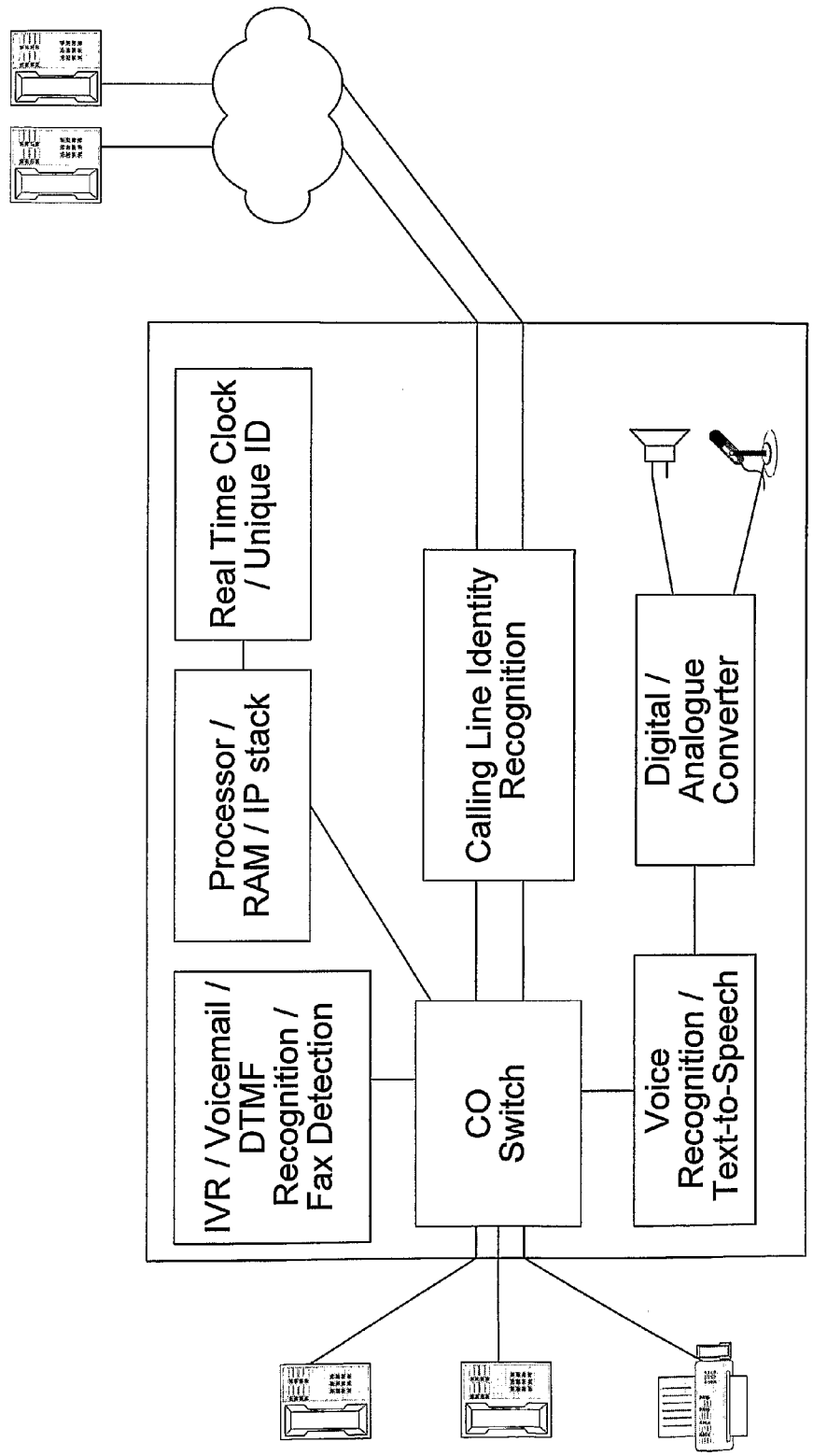
FIG. 13 shows schematic circuit diagram of an embodiment of the apparatus shown in FIG. 1.

FIG. 13 shows a schematic circuit diagram of an embodiment of the apparatus 10, indicating the functionality and interconnection of the various individual integrated circuit modules included within the apparatus 10.

Once a user has connected the apparatus 10 between his phone line 56 and various telephone handsets 58, 60 and a fax machine 62, the user is able to handle incoming calls more effectively and easily, since the user is able to configure advanced call handling functions using a personal computer 66, and enjoy the benefit of the flexible call management provided due to the ability of the system to aggregate other users' treatment of incoming calls.

Co-Operative Working

The apparatus 10 is also able to communicate directly, or via the server 52, with one or more further similar apparatuses. Additionally, a number of apparatuses may be connected to one another, thereby forming a community or cluster of interconnected apparatuses which are then able to communicate with one another and/or pass information to one another. This may at least in part be achieved via the server 52. Thus, a group of apparatuses may communicate information regarding the availability of users to receive calls from one another, and also enables more flexible callback handling.

In particular, the apparatus 10 is able to make calls to other computer systems under its own program control without explicit user instruction, and can receive calls from other computer systems and/or similar apparatuses without explicitly alerting the user. When it is connected to another system or similar apparatus it can transmit and receive information from that apparatus or system. In this way units can work co-operatively with one or many similar apparatuses or other computerised telephone systems.

In one embodiment, the apparatus may be used to mediate between parties to set up a telephone call between them at a time when they are both available.

This is particularly applicable in the context of a call centre which incorporates the apparatus or employs the functionality of the apparatus. In particular, once the apparatus has been installed or deployed at the call centre and at the premises of a user, if a user makes an outgoing call to the call centre and there is no agent available to handle the call the apparatus in the call centres plays a message to the user promising to call them back at a later time (this message may be handled by the call centre's existing voice mail system). When a call centre agent becomes available the call centre's computer exclusively allocates the agent to the callback, dials the user's apparatus and then immediately hangs up (without incurring any call charges). The user's apparatus recognises the calling number with reference to its stored number lists and rings the local telephone to which it is connected to determine whether the user is available. If the user is available, and does pick up the telephone, the user's apparatus will automatically dial the call centre on a number that connects directly to the allocated agent. The benefit of this to the user is that they have not had to wait in a call queue. The benefit to the call centre over existing call back mechanisms is that the call charge is paid for by the user (as it would have been had the user got though to the call centre on their initial call).

If the apparatus 10 is installed by a number of work colleagues, members of the same family, or a friendship group, these apparatuses can be interconnected to one another to form a community or cluster. The apparatuses can then communicate with one another (independently) in order to share information, pass messages or negotiate call times between parties that are mutually convenient. In one embodiment, a cluster is set up by the users via an interface (say a web page) provided on the server 52. The cluster or clusters may be related to the trust groups described above.

In an embodiment, the apparatuses could share certain call receiving preferences of the users with the other apparatuses in the cluster, and then use this information to indicate when other users in the cluster are available and/or willing to receive calls.

In one embodiment, information regarding the availability of users in the cluster could be provided on a user interface (say a web page) provided on the server 52.

The co-operative working aspect has at least some of the following advantages:

Information relating to the availability of a user to receive calls is passed directly between the user and the caller so as to enable a convenient calling time to be arranged.

More flexible and convenient callbacks and/or ringbacks may be arranged.

In the case of a call centre, charges for a callback/ringback are placed with the correct party.

The system and/or the apparatus as herein described preferably possess the ability to enable them to perform all of the functionality described in the appended set of claims, and possess the structure necessary to achieve that functionality.

In summary, embodiments of the invention provide a multi-function device offering the following options:

1. Payment Method

Revenue may be generated by the apparatus 10 dialling a premium rate number—regularly for periodic charges and on an ad-hoc basis for special charges (egg a per item/service).

2. Incoming Call Audit Log

The system gathers evidence about those who violate any applicable regulations—for example those who ignore Regulatory 'do not call' lists and those who cause nuisance calls. Evidence is gathered and aggregated to prove persistent nuisance and to provide evidence for possible compensation claims.

3. Software Controlled Telephone Handset

Apparatus 10 is a household telephone management system that can upgrade its own software.

4. Web Management of Telephone Configuration

Call handling configuration is managed via a web control panel and downloaded to apparatus 10.

5. Phone Bill Verifier

Outgoing call details are logged to the non-volatile memory in apparatus 10, uploaded to server 52 periodically and then compared with phone bill. Alternative phone suppliers may be evaluated.

6. Paid Telemarketing

Companies can pay to get access to the consumer—consumers may agree to accept calls if they are paid or if the company pays compensation to a third party such as a charity.

7. User Feedback

User gets a regular report (perhaps by email) saying how many calls were blocked.

8. Power of Attorney

The user gives the apparatus 10 the right to accept or reject calls—i.e. an effective "Power of Attorney" over their phone calls.

9. Trust Groups

If one user determines certain call handling rules for a particular number then other users may adopt these rules— i.e. a community is created of people whose call management lists can be shared.

10. Professional Voice Answer-Phones

On the system control panel or via a customer services advisor users can request a system message (for example an answer-phone message) to be recorded by a professional voice artist. Once it has been recorded this is uploaded to apparatus 10 from the server 52.

11. Server Synchronisation

Once configuration changes are made at the web site or via a customer services advisor a central phone system dials apparatus 10 and instructs it to dial in to server 52 and synchronise.

12. Distinctive Tune

A key part of the systems functionality is to play an announcement message to unknown callers saying that marketing calls are unwelcome and asking them to press a button on their phone to continue. In order to minimise the disruption to legitimate callers they must be able to interrupt this message by pressing the required key. It is possible for a telemarketer to do this and then claim that they had not violated the customer's wishes because they had not heard the full message.

To minimise this problem all system units will play a short tune to all callers as soon as the line is picked up. This tune will consist of a few notes and will be part of the branding of the system 50 and apparatus 10. Once there is widespread use of the system 50 telemarketers will not be able to claim that they did not know the customer's wishes as the tune will signify that marketing calls are unwelcome.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. An apparatus for handling telephone calls which comprises: means for configuring the operation of the apparatus based on user preferences relating to the handling of calls from particular callers, means for storing the user preferences in a preference database, means for processing incoming calls based on the user preferences, means for enabling the user to classify, during an incoming call from a caller, said caller into one of a plurality of call processing categories for processing that caller in the future, said classification being based directly on a respective call handling option that has been selected by the user from a plurality of available call handling options, and occurring without any further intervention from the user, said classification then being stored as a user preference in the preference database, whereby future calls from said caller are processed in the same way in which the user handles that call, wherein the apparatus is included in a telecommunications network, and the apparatus is without customer premises equipment.

2. An apparatus for handling telephone calls which comprises: a processor and associated memory for configuring the operation of the apparatus based on user preferences relating to the handling of calls from particular callers; processing incoming calls based on the user preferences, enabling a user to classify, during an incoming call from a caller, said caller into one of a plurality of call processing categories for processing that caller in the future, said classification being based directly on a respective call handling option that has been selected by the user from a plurality of available call handling options, and occurring without any further intervention from the user, said classification then being stored as a user preference in a preference database, whereby future calls from said caller are processed in the same way in which the user handles that call; and a memory for storing the user preferences in the preference database, wherein the apparatus is included in a telecommunications network, and the apparatus is without customer premises equipment.

3. An apparatus according to claim 1, wherein the options are selected via a telephone keypad.

4. An apparatus according to claim 1, wherein the classifying means is adapted to classify an incoming call by storing information relating to the call in a list corresponding to each category.

5. An apparatus according to claim 4, wherein the information relates to a caller line identity (CLI).

6. An apparatus according to claim 1, wherein the user is able to select one of the options after the line has been picked up.

7. An apparatus according to claim 1, wherein the classifying means is adapted to add the caller information to a "numbers the user is not willing to receive calls from category" if a received call is rejected by a user.

8. An apparatus according to claim 1, wherein the storing means is adapted to store a complete audit of the handling of all incoming calls.

9. An apparatus according to claim 1, wherein the apparatus is adapted to handle incoming calls in accordance with archived data stored on the apparatus, and wherein the archived data preferably contains information relating to whether the particular caller has called previously, and how the call was handled.

10. An apparatus according to claim 1, wherein the configuration means enables a user to specify that all numbers dialed out by the user are added to a particular category, and preferably wherein the configuration means enables a user to specify that all numbers dialed out by the user are automatically added to a generic "allowed callers" category.

11. An apparatus according to claim 1, wherein the configuration means is further adapted to be configured by the user to handle the most recent call in a particular fashion, and preferably wherein the configuration means provides the user with a selection of possible caller types or categories into which the most recent caller may be categorized.

12. An apparatus according to claim 1, wherein the apparatus is adapted to enable the user to allow a call to ring a telephone extension, to direct it to voicemail, to redirect the call to a mobile phone or to instruct the apparatus to play a message to the caller explaining that the user does not accept solicitations.

13. An apparatus according to claim 1, wherein the configuration means enables the user to specify at least one category of caller which should be handled in a particular manner.

14. An apparatus according to claim 1, wherein the configuration means enables a user to specify that callers in at least one category should be conditionally accepted or rejected.

15. An apparatus according to claim 1, wherein the configuration means enables a user to specify that callers in at least one category should be unconditionally accepted or rejected.

16. An apparatus according to claim 1, wherein the configuration means further enables the user to configure processing preferences relating to the handling of incoming calls, and wherein the processing preferences are based on at least one of the following criteria: the date, the day of the week, the time of day, the geographical origin of the call, any distinctive ring data associated with the call, the status of the apparatus, and whether the call is a voice call or a data call.

17. An apparatus according to claim 1, wherein the processing means is adapted to identify callers based on information accompanying incoming calls, such as caller line identity (CLI) information or text accompanying caller line identity (CLI) information.

18. An apparatus according to claim 1, further comprising means for detecting information transmitted with an incoming call request, and preferably, wherein the information includes at least one of the following details: the caller line identity (CLI), text information accompanying a CLI, the geographical origin of the call, distinctive ring data, and whether the call is a voice call or a data call.

19. An apparatus according to claim 1, wherein the means for enabling the user to select one of a plurality of call handling options comprises an interactive voice response (IVR) system.

20. The apparatus according to claim 1, wherein the apparatus is controlled by a telephone connectable to the telecommunications network.

21. A telecommunications system according to claim 20, wherein the functionality of the apparatus is implemented in a computer executable program.

* * * * *